United States Patent
Higuchi et al.

(10) Patent No.: US 12,270,548 B2
(45) Date of Patent: Apr. 8, 2025

(54) METHOD FOR MOUNTING COMBUSTOR COMPONENT, COMBUSTOR COMPONENT SET, HANGING JIG, AND HANGING JIG SET

(71) Applicant: MITSUBISHI HEAVY INDUSTRIES, LTD., Tokyo (JP)

(72) Inventors: Satoru Higuchi, Yokohama (JP); Shigeharu Yasuda, Yokohama (JP); Seiji Kobayashi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/790,884

(22) PCT Filed: Feb. 19, 2021

(86) PCT No.: PCT/JP2021/006322
§ 371 (c)(1),
(2) Date: Jul. 5, 2022

(87) PCT Pub. No.: WO2021/192758
PCT Pub. Date: Sep. 30, 2021

(65) Prior Publication Data
US 2022/0373183 A1 Nov. 24, 2022

(30) Foreign Application Priority Data
Mar. 23, 2020 (JP) ................. 2020-050936

(51) Int. Cl.
*F01D 25/28* (2006.01)
*F01D 25/24* (2006.01)
*F23R 3/60* (2006.01)

(52) U.S. Cl.
CPC .............. *F23R 3/60* (2013.01); *F01D 25/243* (2013.01); *F01D 25/285* (2013.01);
(Continued)

(58) Field of Classification Search
CPC ............ F23R 3/466; F23R 2900/00017; F01D 25/243; F01D 25/285; F05D 2230/64; F05D 2230/644; F05D 2230/68
See application file for complete search history.

(56) References Cited

U.S. PATENT DOCUMENTS 9,140,142 B2 * 9/2015 Shiotani .................. F01D 9/023
9,938,860 B2 * 4/2018 Alvarez ................ F01D 25/285
(Continued)

FOREIGN PATENT DOCUMENTS

| CN | 102498274 | 6/2012 |
| CN | 106471233 | 3/2017 |

(Continued)

OTHER PUBLICATIONS

International Search Report issued May 11, 2021 in International Application No. PCT/JP2021/06322, with English Translation.
Written Opinion of the International Searching Authority issued May 11, 2021 in International Application No. PCT/JP2021/06322, with English Translation.

*Primary Examiner* — Alain Chau
*Assistant Examiner* — Sean V Meiller
(74) *Attorney, Agent, or Firm* — Wenderoth, Lind & Ponack, L.L.P.

(57) ABSTRACT

In this method for mounting a combustor component, a component hanging step for attaching a string material to a hanging jig mounted on a combustor component and hanging the combustor component with the string material together with the hanging jig, and a component mounting step for mounting a mounting flange of the combustor component at a combustor mounting position of a gas turbine casing are executed. The hanging jig has a hanging tool having a portion which becomes a suspension point contacted by the string material when the string material is attached and hanging the combustor component. The suspension point is positioned on the distal end side of the
(Continued)

center of gravity of the combustor component in the combustor axial line direction when the hanging jig has been mounted to the mounting flange.

6 Claims, 14 Drawing Sheets

(52) U.S. Cl.
CPC .... *F05D 2230/644* (2013.01); *F05D 2230/68* (2013.01); *F05D 2240/14* (2013.01); *F05D 2240/35* (2013.01); *F05D 2260/31* (2013.01); *F23R 2900/00017* (2013.01)

(56) References Cited

U.S. PATENT DOCUMENTS

| | | | |
|---|---|---|---|
| 10,088,167 B2 * | 10/2018 | Mogle | ................... F01D 25/285 |
| 2012/0159955 A1 | 6/2012 | Shiotani et al. | |
| 2017/0030224 A1 | 2/2017 | Alvarez | |
| 2017/0138218 A1 | 5/2017 | Waki | |

FOREIGN PATENT DOCUMENTS

| | | |
|---|---|---|
| JP | 10-196402 | 7/1998 |
| JP | 2000-053370 | 2/2000 |
| JP | 2017-053243 | 3/2017 |

* cited by examiner

METHOD FOR MOUNTING COMBUSTOR COMPONENT, COMBUSTOR COMPONENT SET, HANGING JIG, AND HANGING JIG SET

TECHNICAL FIELD

The present invention relates to a combustor component mounting method of mounting a combustor component to a turbine casing, and a combustor component set, a hanging jig, and a hanging jig set for executing the method.

This application claims the right of priority based on Japanese Patent Application No. 2020-050936 filed with the Japan Patent Office on Mar. 23, 2020, the content of which is incorporated herein by reference.

BACKGROUND ART

A gas turbine includes a gas turbine rotor that rotates around a rotor axis, a gas turbine casing that covers the gas turbine rotor, and a plurality of combustors mounted to the gas turbine casing. The plurality of combustors are mounted to the gas turbine casing side by side in a circumferential direction with respect to the rotor axis.

In a process of assembling the gas turbine, a step of mounting a combustor component configuring a part of the combustor to the gas turbine casing is executed.

The combustor axes of a plurality of combustor components are inclined with respect to the horizontal direction.

PTL 1 stated below discloses the following method as a method for mounting a combustor component to a gas turbine casing.

The combustor component to be mounted by this method has a mounting flange that is mounted to the gas turbine casing, and a nozzle to which the mounting flange is fixed. The nozzle is disposed on the tip side out of the tip side and the base end side in a combustor axis direction in which the combustor axis extends with respect to the mounting flange.

The combustor axis of the combustor disposed on the lower side with respect to a gas turbine axis, among the plurality of combustors, is inclined with respect to the horizontal direction such that the tip side is higher than the base end side. Therefore, in this method, the following jig is used in order to incline the combustor axis of the combustor component with respect to the horizontal direction in the state immediately before the combustor component is mounted to the gas turbine casing.

This jig has a base substrate, a first arm, a first hanging tool, a second arm, and a second hanging tool. The base substrate can be mounted to a mounting flange of the combustor component by bolts. Both the first arm and the second arm are fixed to the base substrate. The first arm extends from the base substrate to the tip side in a state where the base substrate is mounted to the mounting flange. The first hanging tool is mounted to the end on the tip side of the first arm. The second arm extends from the base substrate to the base end side in a state where the base substrate is mounted to the mounting flange. The second hanging tool is mounted to the end on the base end side of the second arm. When a string material is hooked on the first hanging tool to hang the combustor component, a lower hanging point where the string material comes into contact with the first hanging tool is a position in which a balance point of the combustor component is present in the combustor axis direction.

In this method, after the jig described above is mounted to the mounting flange of the combustor component, one string material is hooked on the first hanging tool and the second hanging tool, and an intermediate portion of the string material is set to be an upper hanging point. The portion of the first hanging tool, which is hooked by the string material, is a first lower hanging point, and the portion of the second hanging tool, which is hooked by the string material, is a second lower hanging point. Then, the combustor axis of the combustor component is inclined with respect to the horizontal direction by changing the position which becomes the upper hanging point in the string material such that the distance between the upper hanging point and the first lower hanging point and the distance between the upper hanging point and the second lower hanging point change. Next, the mounting flange of the combustor component is brought into contact with a mounting position of the gas turbine casing by moving the combustor component toward the mounting position of the gas turbine casing while maintaining the direction of the combustor axis direction in a state where the combustor component is hung, and this mounting flange is mounted at the mounting position of the gas turbine casing.

CITATION LIST

Patent Literature

[PTL 1] United States Patent Application Publication No. 2017/0030224

SUMMARY OF INVENTION

Technical Problem

In the method disclosed in PTL 1, the combustor component can be hung in a state where the combustor axis is inclined with respect to the horizontal direction, immediately before the combustor component is mounted to the gas turbine casing. However, in the method disclosed in PTL 1, it is necessary to change the position which becomes the upper hanging point in the string material in a state where the combustor component, which is a heavy object, is hung by the string material, and thus a labor hour is required for the work of mounting the combustor component.

Therefore, an object of the present invention is to provide a technique capable of reducing the labor hour of the work of mounting a combustor component to a gas turbine casing.

Solution to Problem

A method for mounting a combustor component as an aspect of the invention for achieving the above object is a method for mounting a combustor component to a gas turbine casing, the combustor component having a mounting flange that extends in a radial direction with respect to a combustor axis and is mounted to the gas turbine casing, and a nozzle that injects fuel and is disposed on a tip side out of a base end side and the tip side in a combustor axis direction in which the combustor axis extends, with respect to the mounting flange. In this mounting method, a preparation step of preparing at least one hanging jig for hanging the combustor component with a string material, a jig mounting step of mounting the hanging jig to the mounting flange of the combustor component, a component hanging step of hooking a string material on the hanging jig mounted to the combustor component and hanging the combustor component together with the hanging jig with the string material, a component pushing step of bringing the mounting flange of the combustor component into contact with a combustor mounting position in the gas turbine casing by moving the combustor component to the tip side while maintaining a direction of the combustor axis direction in a state where the combustor component is hung, a jig removing step of removing the hanging jig from the mounting flange during the component pushing step and before the mounting flange of the combustor component comes into contact with the gas turbine casing; and a component mounting step of mounting the mounting flange at the combustor mounting position of the gas turbine casing after the component pushing step are executed. The hanging jig that is prepared in the preparation step includes an adjustment member having a longitudinal direction, a flange fixture that is mounted to an end on a longitudinal direction first side out of the longitudinal direction first side and a longitudinal direction second side in the longitudinal direction of the adjustment member, and mounts the adjustment member to the mounting flange, and a hanging tool that is mounted to an end on the longitudinal direction second side of the adjustment member and has a portion that becomes a lower hanging point with which the string material comes into contact when the string material is hooked to hang the combustor component. The lower hanging point is located on the tip side with respect to a center of gravity of the combustor component in the combustor axis direction when the hanging jig is mounted to the mounting flange.

In the gas turbine provided with a plurality of combustors, when each combustor is mounted to the gas turbine casing, the combustor axis of each combustor is inclined with respect to the gas turbine axis (GT axis) so as to be directed toward the radial direction inside with respect to the GT axis as it goes from the gas turbine axis upstream side (GT axis upstream side) toward the gas turbine axis downstream side (GT axis downstream side). In other words, the combustor axis of the combustor is inclined with respect to the GT axis such that the tip side becomes closer to the GT axis than on the base end side. Therefore, the combustor axis of the combustor disposed below the GT axis, among the plurality of combustors, becomes higher on the tip side than on the base end side. In the present specification, the word "bottom" means the bottom in the vertical direction, and the word "top" means the top in the vertical direction.

In this aspect, when the combustor component is hung by using the hanging jig, the combustor axis of the combustor component becomes higher on the tip side than on the base end side. Therefore, in this aspect, it is possible to eliminate or reduce the work of adjusting the inclination of the combustor axis in a state where the combustor component, which is a heavy object, is hung by the string material.

A hanging jig as another aspect of the invention for achieving the above object is a hanging jig for hanging a combustor component having a mounting flange that extends in a radial direction with respect to a combustor axis and is mounted to a gas turbine casing. The hanging jig includes: an adjustment member having a longitudinal direction; a flange fixture that is mounted to an end on a longitudinal direction first side out of the longitudinal direction first side and a longitudinal direction second side in the longitudinal direction of the adjustment member, and mounts the adjustment member to the mounting flange; and a hanging tool having a portion that becomes a lower hanging point with which a string material comes into contact when the string material is hooked to hang the combustor component. At least the flange fixture out of the flange fixture and the hanging tool has a structure capable of being mounted to and demounted from the adjustment member.

As described above, the combustor axis of the combustor disposed below the GT axis, among the plurality of combustors, becomes higher on the tip side than on the base end side. In this aspect, when the combustor component is hung by using the hanging jig having the adjustment member having an adjusted length in the longitudinal direction, the combustor axis of the combustor component becomes higher on the tip side than on the base end side. Therefore, in this aspect, it is possible to eliminate or reduce the work of adjusting the inclination of the combustor axis in a state where the combustor component, which is a heavy object, is hung by the string material.

A hanging jig set as still another aspect of the invention for achieving the above object includes the hanging jig in the above aspect, and a second adjustment member having a longitudinal direction. A length in the longitudinal direction of the second adjustment member is different from a length in the longitudinal direction of the adjustment member of the hanging jig. The flange fixture of the hanging jig is capable of being mounted to an end on a longitudinal direction first side out of a longitudinal direction first side and the longitudinal direction second side in the longitudinal direction of the second adjustment member. The hanging tool of the hanging jig is capable of being mounted to an end on the longitudinal direction second side of the second adjustment member.

As for the inclination of the combustor axis of the combustor component, when the mounting position in the gas turbine casing is different, the inclination of the combustor axis of the combustor component is different. Therefore, in this aspect, the combustor axis of the combustor component can be inclined according to the mounting position by properly using the hanging jig having the adjustment member and the hanging jig having the second adjustment member.

A combustor component set as still yet another aspect of the invention for achieving the above object includes the hanging jig in the above aspect, and the combustor component. The combustor component has a nozzle that injects fuel, and the nozzle is disposed on a tip side out of a base end side and the tip side in a combustor axis direction in which the combustor axis extends with respect to the mounting flange. The lower hanging point of the hanging jig is located on the tip side with respect to a center of gravity of the combustor component in the combustor axis direction when the hanging jig is mounted to the mounting flange.

As described above, the combustor axis of the combustor disposed below the GT axis, among the plurality of combustors, becomes higher on the tip side than on the base end side. When the combustor component is hung by using the hanging jig of this aspect, the combustor axis of the combustor component becomes higher on the tip side than on the base end side. Therefore, in this aspect, it is possible to eliminate or reduce the work of adjusting the inclination of the combustor axis in a state where the combustor component, which is a heavy object, is hung by the string material.

A combustor component set as further aspect of the invention for achieving the above object includes:

a combustor component having a mounting flange that extends in a radial direction with respect to a combustor axis and is mounted to a gas turbine casing, and a nozzle that injects fuel and is disposed on a tip side out of a base end side and the tip side in a combustor axis direction in which the combustor axis extends with respect to the mounting flange; and a hanging jig that hangs the combustor component with a string material. The hanging jig includes an adjustment member having a longitudinal direction; a flange fixture that is mounted to an end on a longitudinal direction first side out of the longitudinal direction first side and a longitudinal direction second side in the longitudinal direction of the adjustment member, and mounts the adjustment member to the mounting flange; and a hanging tool that is mounted to an end on the longitudinal direction second side of the adjustment member and has a portion that becomes a lower hanging point with which the string material comes into contact when the string material is hooked to hang the combustor component. The lower hanging point is located on the tip side with respect to a center of gravity of the combustor component in the combustor axis direction when the hanging jig is mounted to the mounting flange.

Advantageous Effects of Invention

In an aspect of the present invention, it is possible to eliminate or reduce the work of adjusting the inclination of the combustor axis in a state where the combustor component, which is a heavy object, is hung by the string material. Therefore, according to an aspect of the present invention, it is possible to reduce the labor hour of the work of mounting the combustor component to the gas turbine casing.

DESCRIPTION OF EMBODIMENTS

Hereinafter, embodiments of a method for mounting a combustor component, a combustor component set, a hanging jig, and a hanging jig set according to the present invention, and modification examples thereof will be described.

[Embodiment of Gas Turbine]

First, an embodiment of a gas turbine that includes a combustor component will be described using FIGS. 1 to 3.

Figure 1:
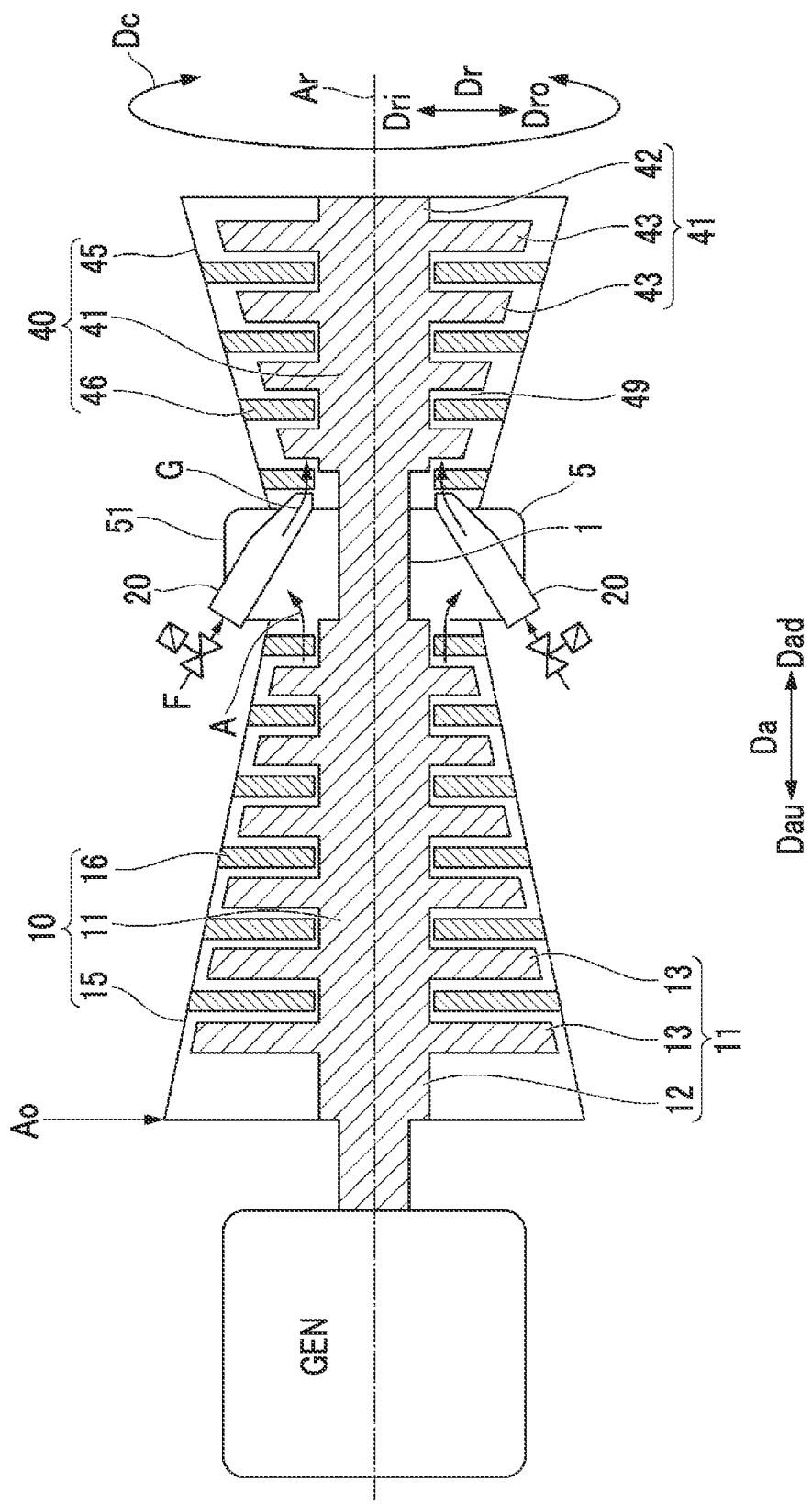
FIG. 1 is a schematic sectional view of a gas turbine in an embodiment of the present invention.

As shown in FIG. 1, the gas turbine of the present embodiment includes a compressor 10 that compresses outside air Ao to generate compressed air A, a plurality of combustors 20 that burn fuel in the compressed air A to generate combustion gas G, and a turbine 40 that is driven by the combustion gas G.

The compressor 10 includes a compressor rotor 11 that rotates around a gas turbine axis (hereinafter referred to as a GT axis) Ar, a compressor casing 15 that covers the compressor rotor 11, and a plurality of stator vane rows 16. The turbine 40 includes a turbine rotor 41 that rotates around the GT axis Ar, a turbine casing 45 that covers the turbine rotor 41, and a plurality of stator vane rows 46.

The compressor rotor 11 and the turbine rotor 41 are located on the same GT axis Ar and are connected to each other to form a gas turbine rotor 1. For example, a rotor of a generator GEN is connected to the gas turbine rotor 1. In the following, the direction in which the GT axis Ar extends is referred to as a GT axis direction Da. The GT axis direction Da is a substantially horizontal direction. In the GT axis direction Da, the compressor 10 side with the turbine 40 as a reference is referred to as a GT axis upstream side Dau and the opposite side is referred to as a GT axis downstream side Dad. Further, the circumferential direction centered on the GT axis Ar is simply referred to as a circumferential direction Dc, and the direction perpendicular to the GT axis Ar is referred to as a radial direction Dr. Further, in the radial direction Dr, the side approaching the GT axis Ar is referred to as a radial direction inside Dri, and the opposite side is referred to as a radial direction outside Dro.

The compressor rotor 11 has a rotor shaft 12 centered on the GT axis Ar and extending in the GT axis direction Da, and a plurality of rotor blade rows 13 mounted on the rotor shaft 12. The plurality of rotor blade rows 13 are arranged in the GT axis direction Da. Each of the rotor blade rows 13 is composed of a plurality of rotor blades arranged in the circumferential direction Dc. The stator vane row 16 is disposed on the GT axis downstream side Dad of each of the plurality of rotor blade rows 13. Each of the stator vane rows 16 is provided inside the compressor casing 15. Each of the stator vane rows 16 is composed of a plurality of stator vanes arranged in the circumferential direction Dc.

The turbine rotor 41 has a rotor shaft 42 centered on the GT axis Ar and extending in the GT axis direction Da, and a plurality of rotor blade rows 43 mounted on the rotor shaft 42. The plurality of rotor blade rows 43 are arranged in the GT axis direction Da. Each of the rotor blade rows 43 is composed of a plurality of rotor blades arranged in the circumferential direction Dc. The stator vane row 46 is disposed on the GT axis upstream side Dau of each of the plurality of rotor blade rows 43. Each of the stator vane rows 46 is provided inside the turbine casing 45. Each of the stator vane rows 46 is composed of a plurality of stator vanes arranged in the circumferential direction Dc.

An annular space between the outer periphery side of the rotor shaft 42 and the inner periphery side of the turbine casing 45, where the rotor blade row 43 and the stator vane row 46 are disposed in the GT axis direction Da, forms a combustion gas flow path 49 through which the combustion gas G from the combustor 20 flows. The combustion gas flow path 49 has an annular shape centered on the GT axis Ar and is long in the GT axis direction Da.

The gas turbine further includes a tubular intermediate casing 51 centered on the GT axis Ar. The intermediate casing 51 is disposed between the compressor casing 15 and the turbine casing 45 in the GT axis direction Da. An upstream-side flange 52 (refer to FIG. 2) that is connected to the compressor casing 15 is formed at the end on the GT axis upstream side Dau of the intermediate casing 51. Further, a downstream-side flange 53 (refer to FIG. 2) that is connected to the turbine casing 45 is formed at the end on the GT axis downstream side Dad of the intermediate casing 51. The compressor casing 15, the intermediate casing 51, and the turbine casing 45 are connected to each other to form a gas turbine casing 5.

Figure 2:
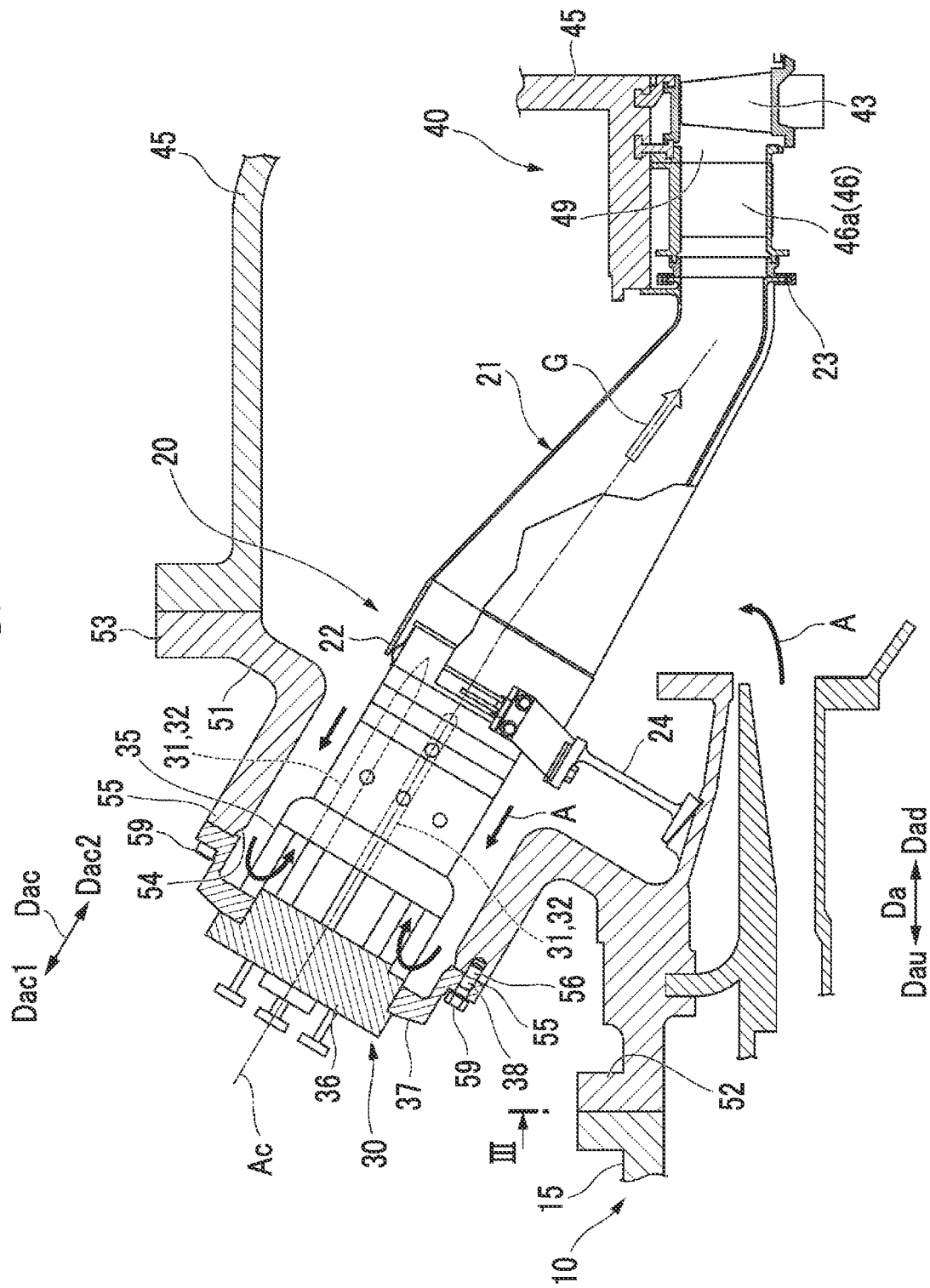
FIG. 2 is a sectional view of a main part of the gas turbine in the embodiment of the present invention.
Figure 3:
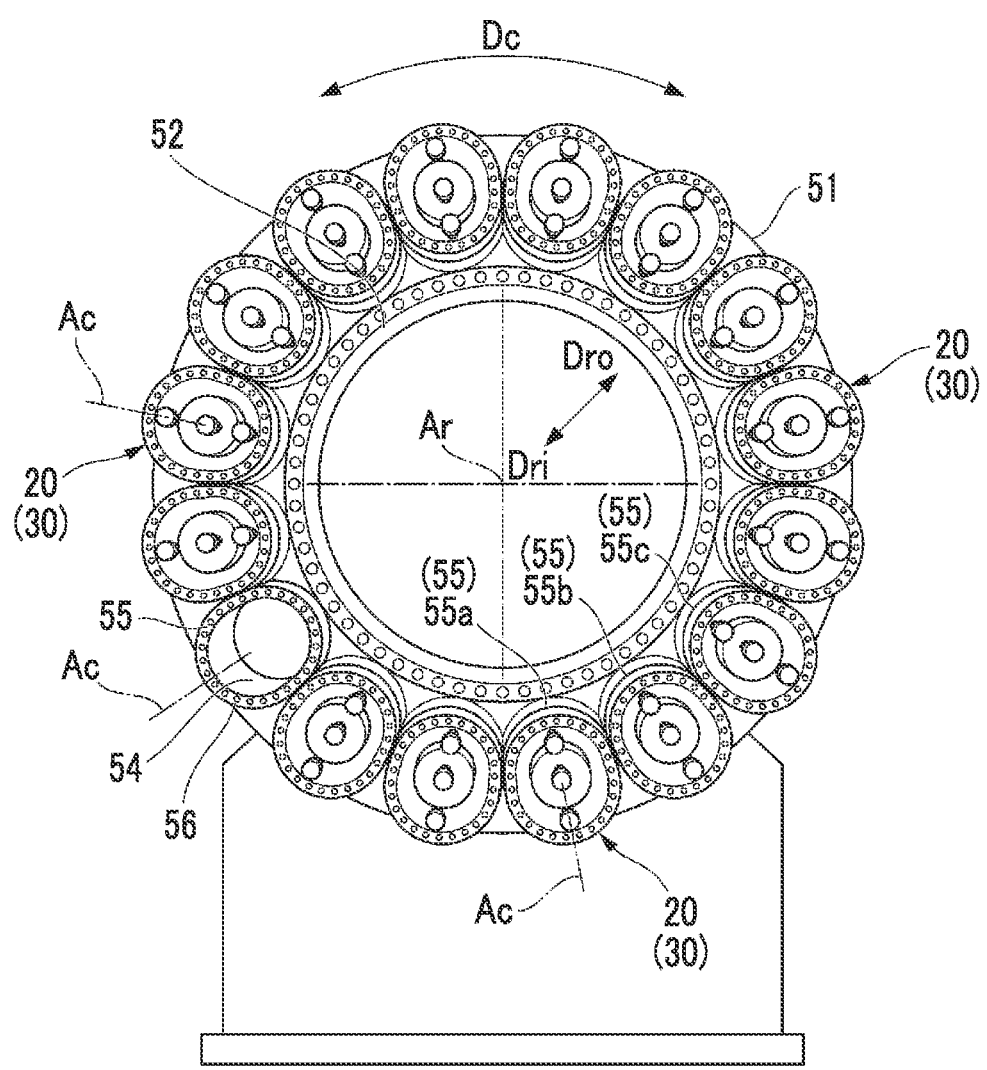
FIG. 3 is a diagram as viewed from the direction of an arrow III in FIG. 2.

As shown in FIGS. 1 to 3, the plurality of combustors 20 are fixed to the intermediate casing 51 at intervals with respect to one another in the circumferential direction Dc. The combustor 20 has a combustion cylinder (or a transition piece) 21 that sends the high-temperature and high-pressure combustion gas G to the combustion gas flow path 49 in the turbine casing 45, and a fuel nozzle 30 that injects fuel F together with the compressed air A into the combustion cylinder 21. The fuel nozzle 30 is the combustor component in the present embodiment.

The combustion cylinder 21 has a tubular shape around a combustor axis Ac. Here, the direction in which the combustor axis Ac extends is referred to as a combustor axis direction Dac. Further, one side of both sides in the combustor axis direction Dac is referred to as a base end side Dac1, and the other side is referred to as a tip side Dac2. Both ends 22 and 23 in the combustor axis direction Dac of the tubular combustion cylinder 21 are open. The opening end 22 on the base end side Dac1 of the combustion cylinder 21 is supported by a combustion cylinder support 24 fixed to the intermediate casing 51. A part of the fuel nozzle 30 is inserted into the opening end 22 on the base end side Dac1 of the combustion cylinder 21. The opening end 23 on the tip side Dac2 of the combustion cylinder 21 is supported by the turbine casing 45 and is connected to a first stator vane row 46*a* on the most upstream side, among the plurality of stator vane rows 46 of the turbine 40.

The fuel nozzle 30 as the combustor component includes a plurality of burners 31, a burner holding cylinder 35 that covers the outer periphery side of the plurality of burners 31, a top flange (a mounting flange) 37 that is mounted to the intermediate casing 51, and a nozzle base 36 fixed to the top flange 37.

Each of the burners 31 has a nozzle 32 long in the combustor axis direction Dac. The portion on the base end side Dac1 of the nozzle 32 is fixed to the nozzle base 36. Further, the burner holding cylinder 35 has a tubular shape around the combustor axis Ac and covers the outer periphery side of the plurality of burners 31. The end on the base end side Dac1 of the burner holding cylinder 35 is fixed to the top flange 37.

The top flange 37 protrudes in the radial direction with respect to the combustor axis Ac from the nozzle base 36. That is, the top flange 37 extends in the radial direction with respect to the combustor axis Ac. A plurality of bolt holes 38 penetrating in the combustor axis direction Dac are formed in the top flange 37.

A plurality of openings 54 are formed in the intermediate casing 51. The plurality of openings 54 are arranged at intervals with respect to one another in the circumferential direction Dc. A combustor mounting flange 55 is formed around each of the openings 54. A plurality of bolt screw holes 56 recessed in the GT axis direction Da is formed in the combustor mounting flange 55. When the fuel nozzle 30 is mounted to the intermediate casing 51, a screw shaft portion of a combustor mounting bolt 59 is inserted into the bolt hole 38 of the top flange 37 in the combustor 20 and then screwed into the bolt screw hole 56 of the combustor mounting flange 55. In this manner, when the fuel nozzle 30 is mounted to the intermediate casing 51, the combustor axis direction Dac of the fuel nozzle 30 becomes a direction that includes the direction component of the GT axis direction Da. Further, at this time, the base end side Dac1 of the fuel nozzle 30 becomes the GT axis upstream side Dau in the GT axis direction Da, and the tip side Dac2 of the fuel nozzle 30 becomes the GT axis downstream side Dad.

As shown in FIGS. 2 and 3, the flange surface of the combustor mounting flange 55 is a surface inclined with respect to the GT axis Ar so as to be directed to the radial direction outside Dro as it goes from the GT axis upstream side Dau toward the GT axis downstream side Dad. When the fuel nozzle 30 is mounted to the combustor mounting flange 55, the combustor axis Ac of the fuel nozzle 30 extends in a direction substantially perpendicular to the flange surface of the combustor mounting flange 55. Therefore, when the fuel nozzle 30 is mounted to the combustor mounting flange 55, the combustor axis Ac of the fuel nozzle 30 is inclined with respect to the GT axis Ar so as to be directed to the radial direction inside Dri as it goes from the GT axis upstream side Dau toward the GT axis downstream side Dad. In other words, the combustor axis Ac of the fuel nozzle 30 is inclined with respect to the GT axis Ar such that the tip side Dac2 becomes closer to the GT axis Ar than on the base end side Dac1.

The compressor 10 sucks in the outside air Ao and compresses the air in the process in which the air passes through the inside of the compressor casing 15. The compressed air, that is, the compressed air A, flows from the compressor 10 into the intermediate casing 51. The compressed air A flows from the inside of the intermediate casing 51 into the burner holding cylinder 35. The compressed air A that has flowed into the burner holding cylinder 35 flows into each burner 31. Each burner 31 injects the compressed air A and the fuel F into the combustion cylinder 21. The fuel F burns in the combustion cylinder 21. As a result of this combustion, the combustion gas G is generated. The combustion gas G flows from the combustion cylinder 21 into the combustion gas flow path 49 (refer to FIG. 2) in the turbine casing 45. The combustion gas G passes through the combustion gas flow path 49, so that the turbine rotor 41 rotates.

[Embodiment of Hanging Jig, Hanging Jig Set, and Combustor Component Set]

An embodiment of a hanging jig, a hanging jig set, and a combustor component set according to the present invention will be described with reference to FIGS. 3 to 5, and 10. The combustor component in the present embodiment is the fuel nozzle 30, as described above.

The fuel nozzle 30 to which the hanging jig of the present embodiment is mounted is the fuel nozzle 30 that is disposed on the lower side with the GT axis Ar as a reference, among the plurality of fuel nozzles 30 shown in FIG. 3.

Figure 4:
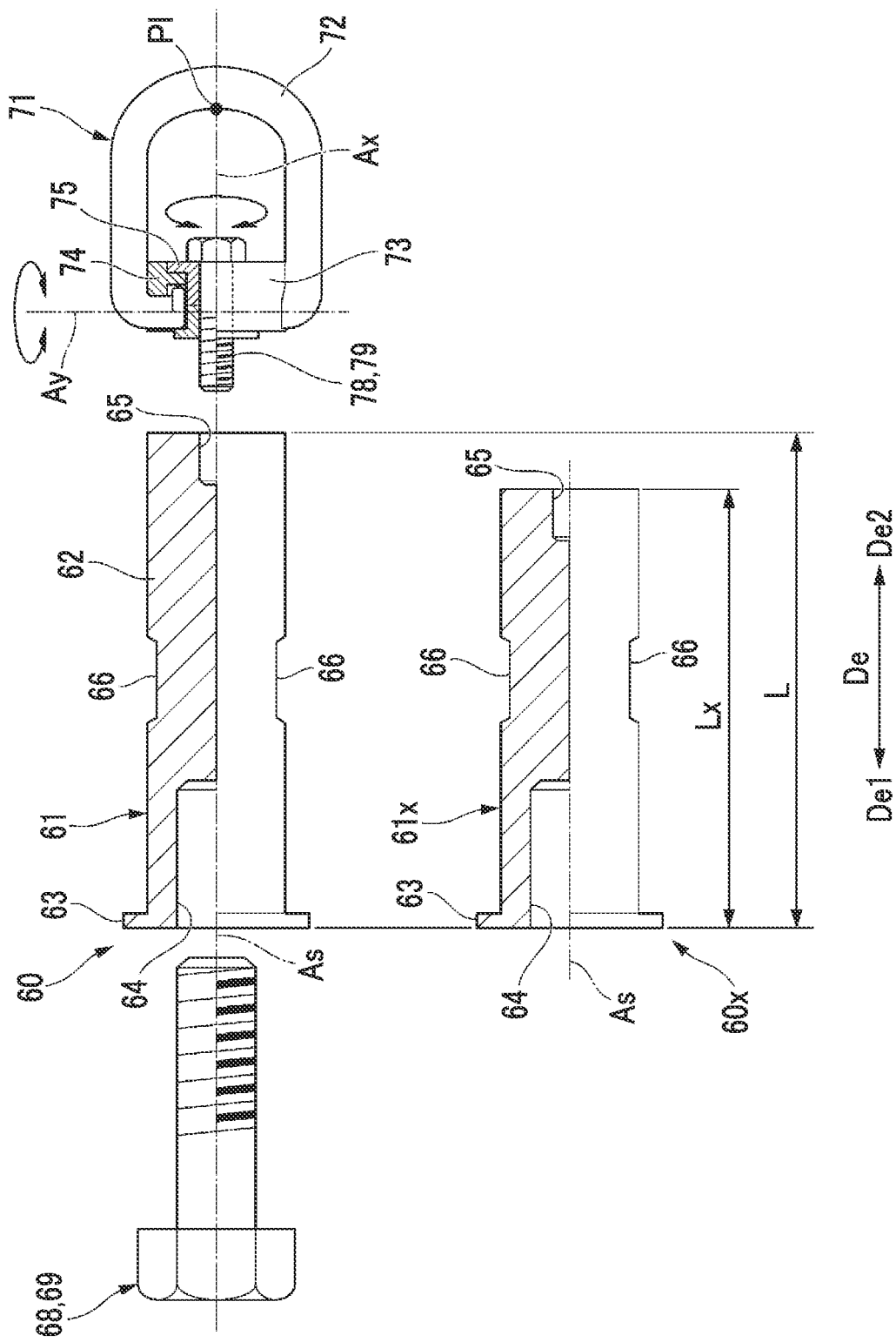
FIG. 4 is an exploded view of a hanging jig in an embodiment of the present invention.
Figure 5:
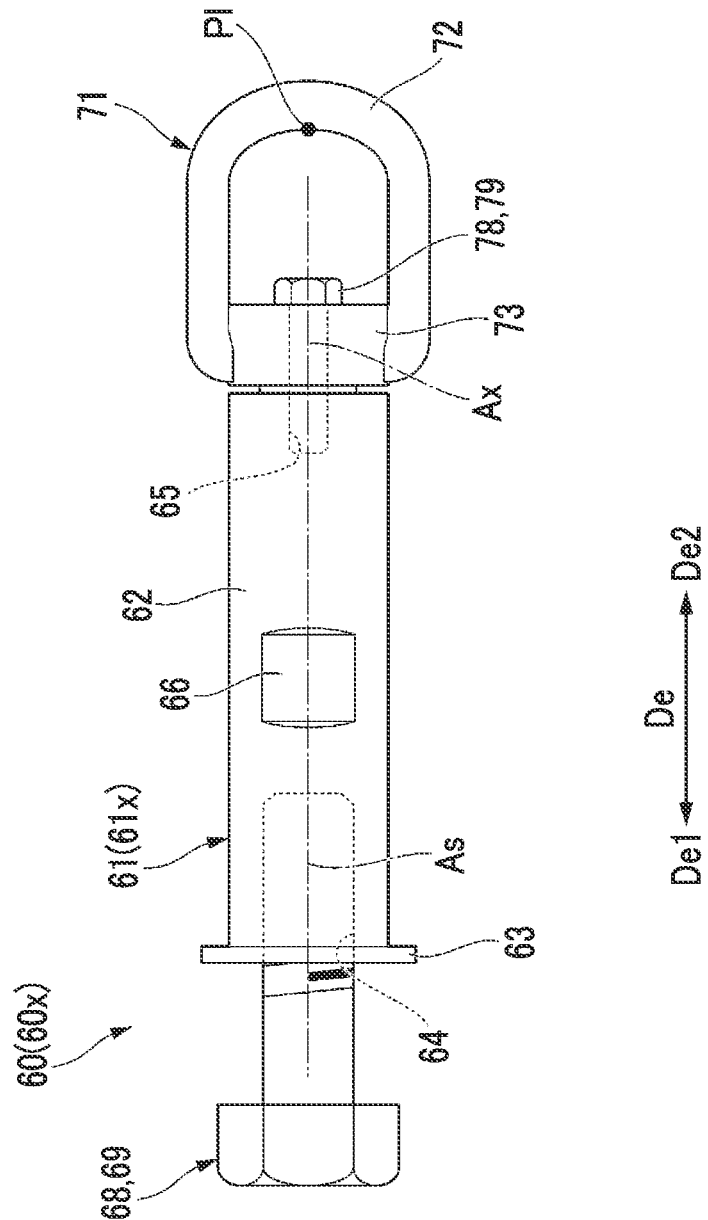
FIG. 5 is an assembly diagram of the hanging jig in the embodiment of the present invention.

As shown in FIGS. 4 and 5, a hanging jig 60 of the present embodiment includes a columnar adjustment rod (adjustment member) 61 centered on a rod axis As, a flange fixture 68 for mounting the adjustment rod 61 to the top flange (mounting flange) 37 of the fuel nozzle 30, and a hanging tool 71 on which a string material is hooked. Here, the direction in which the rod axis As extends is referred to as a longitudinal direction De. Further, one side of both sides in the longitudinal direction De is referred to as a longitudinal direction first side De1, and the other side is referred to as a longitudinal direction second side De2.

The adjustment rod 61 has a rod main body 62 and a receiving flange 63. The rod main body 62 is a columnar rod centered on the rod axis As and extending in the longitudinal direction De. The receiving flange 63 protrudes in the radial direction with respect to the rod axis As from the end on the longitudinal direction first side De1 of the rod main body 62. The rod main body 62 has a first screw hole 64, a second screw hole 65, and two tool contact surfaces 66. The first screw hole 64 is a female screw hole recessed from the end on the longitudinal direction first side De1 of the rod main body 62 toward the longitudinal direction second side De2. The second screw hole 65 is a female screw hole recessed from the end on the longitudinal direction second side De2 of the rod main body 62 toward the longitudinal direction first side De1. The two tool contact surfaces 66 are flat surfaces facing opposite sides from each other in a direction perpendicular to the longitudinal direction De.

The flange fixture 68 has a first bolt 69 having a screw shaft portion that can be screwed into the first screw hole 64 of the adjustment rod 61. Therefore, the flange fixture 68 can be mounted to and demounted from the adjustment rod 61. When the hanging jig 60 is mounted to the top flange 37, the screw shaft portion of the first bolt 69 is inserted into the bolt hole 38 of the top flange 37 and then the screw shaft portion of the first bolt 69 is screwed into the first screw hole 64 of the adjustment rod 61.

Figure 10:
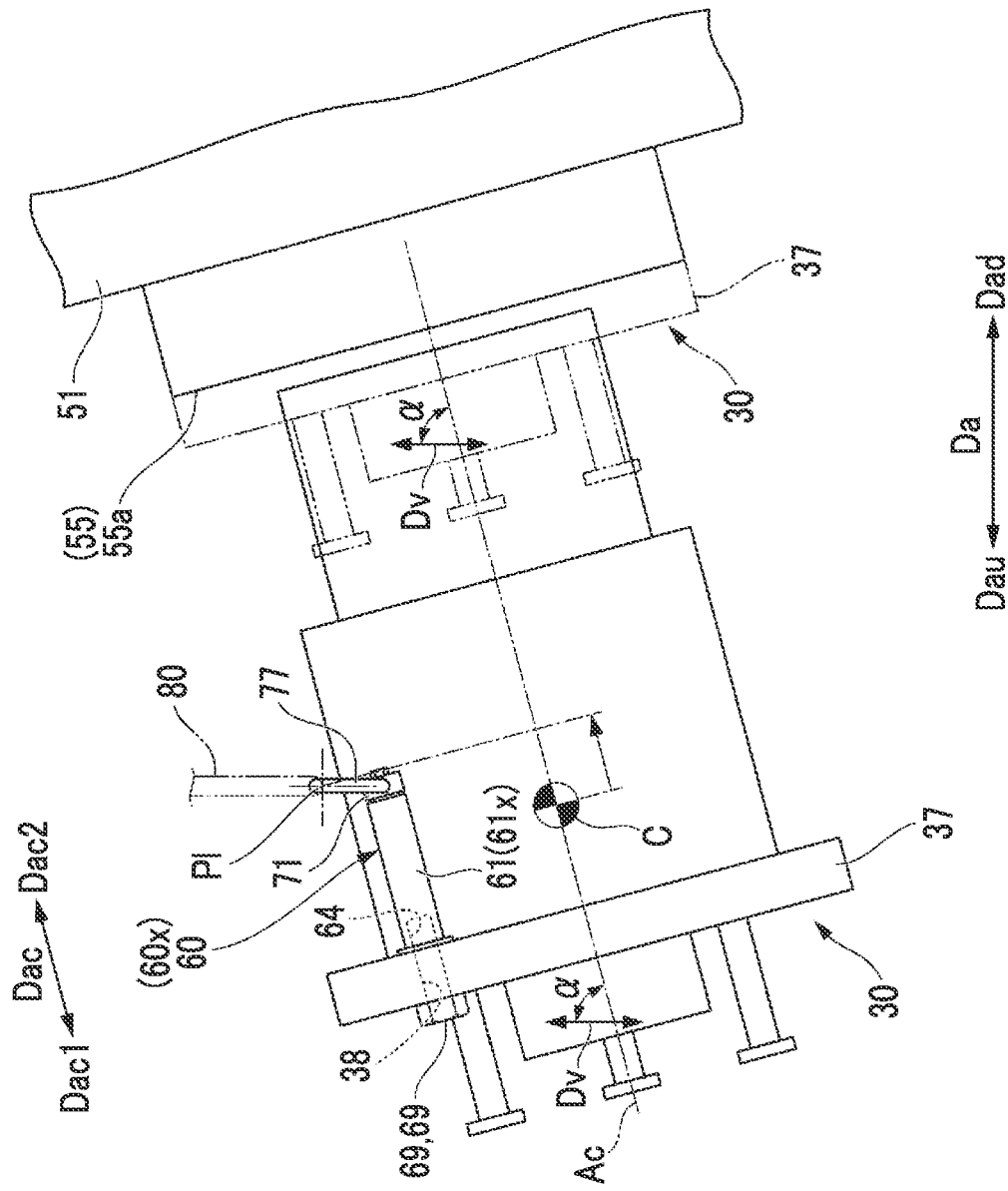
FIG. 10 is a side view of the hanging jig and the combustor component during the component hanging step in an embodiment of the present invention.

The hanging tool 71 has a hanging ring 72, a hanging ring support 73, and a support fixture 78. The hanging ring 72 is a component formed in an annular shape by bending a rod. Both ends of the rod face each other with a gap therebetween. The hanging ring 72 has a portion that becomes a lower hanging point Pl with which a string material 80 comes into contact when the string material 80 is hooked on the hanging ring 72 to hang the fuel nozzle 30, as shown in FIG. 10.

The hanging ring support 73 has a support main body 74 and a sleeve 75. The support main body 74 has a cylindrical shape. Both ends of the hanging ring 72 are located on a swing axis Ay extending in a direction perpendicular to the central axis of the cylinder of the support main body 74. The support main body 74 supports both ends of the hanging ring 72 such that the hanging ring 72 can swing around the swing axis Ay. The sleeve 75 has a cylindrical shape and is mounted to the inner periphery side of the cylindrical support main body 74.

The support fixture 78 has a second bolt 79 having a screw shaft portion that can be screwed into the second screw hole 65 of the adjustment rod 61. The hanging ring support 73 is mounted to the adjustment rod 61 by inserting the screw shaft portion of the second bolt 79 into the sleeve 75 of the hanging ring support 73 and screwing the screw shaft portion into the second screw hole 65 of the adjustment rod 61. Therefore, the hanging tool 71 having the support fixture 78 can be mounted to and demounted from the adjustment rod 61. Further, the screw shaft portion of the second bolt 79 comes into contact with the inner peripheral surface of the sleeve 75 and is rotatable around a central axis Ax of the cylindrical sleeve 75. Therefore, the second bolt 79 is rotatable around the screw shaft portion of the second bolt 79 with respect to the hanging ring support 73. Further, the second bolt 79 is screwed into the second screw hole 65 of the adjustment rod 61, so that it cannot move relative to the hanging ring support 73 in the longitudinal direction De in which the screw shaft portion of the second bolt 79 extends. The central axis Ax of the sleeve 75 is located on the rod axis As when the hanging tool 71 is mounted to the adjustment rod 61.

With the above configuration, the hanging ring 72 of the hanging tool 71 mounted to the adjustment rod 61 by the support fixture 78 is rotatable around the rod axis As and swingable around the swing axis Ay perpendicular to the rod axis As. Therefore, in the present embodiment, when the fuel nozzle 30 is hung by using the hanging jig 60, the hanging ring support 73 rotates with respect to the second bolt 79 such that stress occurring in the hanging ring 72 and the hanging ring support 73 is reduced, and the hanging ring 72 swings with respect to the hanging ring support 73. Therefore, when the fuel nozzle 30 is hung by using the hanging jig 60 of the present embodiment, it is possible to suppress damage to the hanging jig 60.

The hanging jig set includes a second adjustment rod (a second adjustment member) 61x in addition to the hanging jig 60 described above. The configuration of the second adjustment rod 61x is the same as the structure of the adjustment rod 61 of the hanging jig 60 described above. Therefore, the second adjustment rod 61x also has the receiving flange 63, the first screw hole 64, the second screw hole 65, and the two tool contact surfaces 66, similar to the adjustment rod 61 of the hanging jig 60 described above. In this manner, since the second adjustment rod 61x also has the first screw hole 64 and the second screw hole 65, both the flange fixture 68 and the hanging tool 71 described above can be mounted to and demounted from the second adjustment rod 61x. However, a length Lx in the longitudinal direction De of the second adjustment rod 61x is different from a length L in the longitudinal direction De of the adjustment rod 61 described above. In the following, the hanging jig having the second adjustment rod 61x, the flange fixture 68, and the hanging tool 71 will be referred to as a separate hanging jig 60x.

The hanging jig set may include a plurality of second adjustment rods 61x. In this case, the lengths in the longitudinal direction De of the plurality of second adjustment rods 61x and the length in the longitudinal direction De of the adjustment rod 61 described above are different from each other.

The combustor component set includes the hanging jig 60 described above and the fuel nozzle 30 which is the combustor component, as shown in FIG. 10. The combustor component set may include a plurality of fuel nozzles 30, the hanging jig 60 described above, and one or more second adjustment rods 61x.

Incidentally, as described above, when the fuel nozzle 30 is mounted to the intermediate casing 51, the combustor axis Ac of the fuel nozzle 30 is inclined with respect to the GT axis Ar such that the tip side Dac2 becomes closer to the GT axis Ar than on the base end side Dac1. Therefore, as shown in FIG. 10, the combustor axis Ac of the fuel nozzle 30 mounted at the position on the lower side with the GT axis Ar as a reference in the intermediate casing 51 becomes higher on the tip side Dac2 than on the base end side Dac1.

The lower hanging point Pl of the hanging jig 60 that is included in the combustor component set is located on the tip side Dac2 with respect to a center of gravity C of the fuel nozzle 30 in the combustor axis direction Dac of the fuel nozzle 30 when the hanging jig 60 is mounted to the top flange 37 of the fuel nozzle 30, as shown in FIG. 10. Therefore, the combustor axis Ac of the fuel nozzle 30 in a state where the string material 80 is hooked on the hanging jig 60 to hang the fuel nozzle 30 becomes higher on the tip side Dac2 than on the base end side Dac1, similar to the combustor axis Ac of the fuel nozzle 30 mounted to the position on the lower side with the GT axis Ar as a reference in the intermediate casing 51.

The position of the lower hanging point Pl in the combustor axis direction Dac is preferably a position where an angle α of the combustor axis Ac of the fuel nozzle 30 hung by the string material 80 with respect to a vertical direction Dv coincides with an angle α of the combustor axis Ac of the fuel nozzle 30 mounted to the lower side of the intermediate casing 51 with respect to the vertical direction Dv. The expression "coincidence of the angles" as referred to herein does not need to be coincidence in the exact sense, and it is sufficient if the angles substantially coincide with each other, and for example, a difference by the angle of about 5° is within the range of the coincidence. However, with respect to the expression "coincidence of the angles" as referred to herein, even if there is a difference by an angle of 5° or more, if the angles are different to some extent that the work of mounting the fuel nozzle 30 to the lower side of the intermediate casing 51 is easy, the angles are regarded as coinciding with each other. Further, the angle here is an angle in a virtual plane that extends in the vertical direction Dv and includes the combustor axis Ac of the fuel nozzle 30.

[Embodiment of Method for Mounting Combustor Component]

Figure 6:
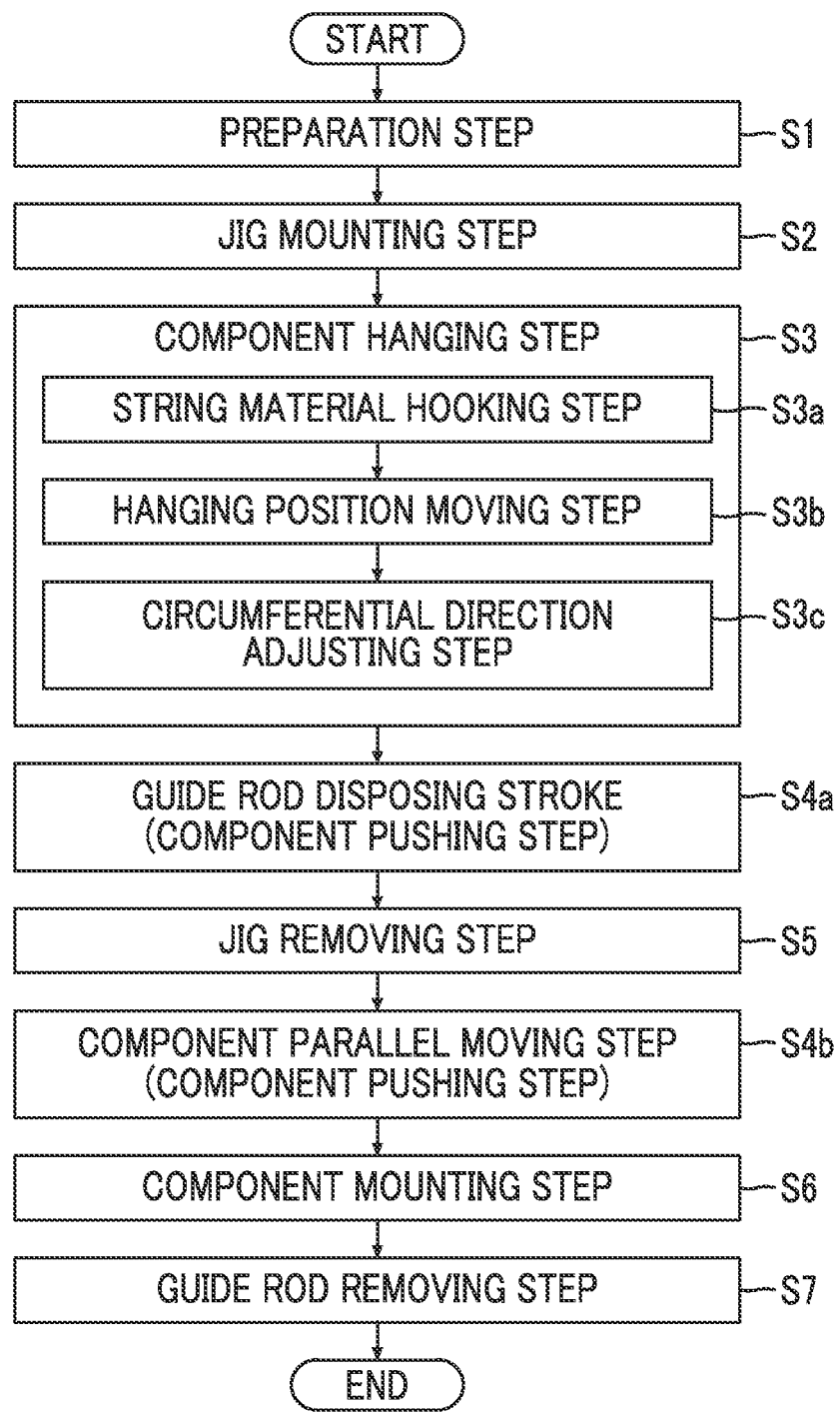
FIG. 6 is a flowchart showing the procedure of a method for mounting a combustor component in an embodiment of the present invention.

An embodiment of the method for mounting a combustor component according to the present invention will be described according to the flowchart shown in FIG. 6. In the following, a method for mounting the fuel nozzle 30 that is the combustor component 30 to the combustor mounting flange 55 located at the lowest position, among the plurality of combustor mounting flanges 55 arranged in the circumferential direction Dc around the GT axis Ar, will be described.

First, two hanging jigs 60 described using FIGS. 4 and 5 are prepared (S1: preparation step). Both the positions of the lower hanging points Pl of the two hanging jigs 60 that are prepared in this preparation step (S1) are positions where the angle α of the combustor axis Ac of the fuel nozzle 30 hung by the string material 80 with respect to the vertical direction Dv coincides with the angle α of the combustor axis Ac of the fuel nozzle 30 mounted to the lower side of the intermediate casing 51 with respect to the vertical direction Dv, as shown in FIG. 10.

Figure 7:
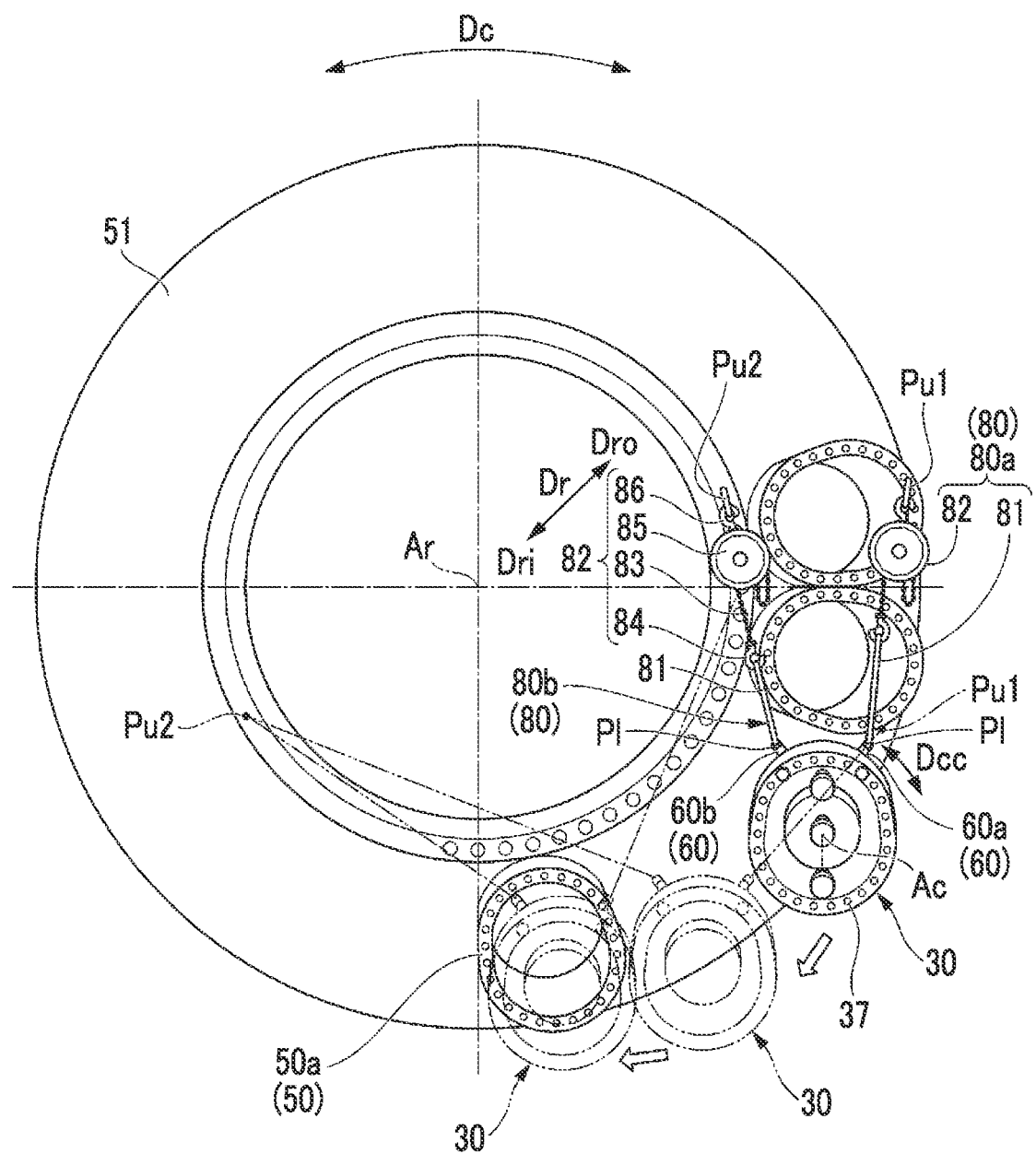
FIG. 7 is an explanatory diagram showing a work content in a jig mounting step and a component hanging step in an embodiment of the present invention.
Figure 8:
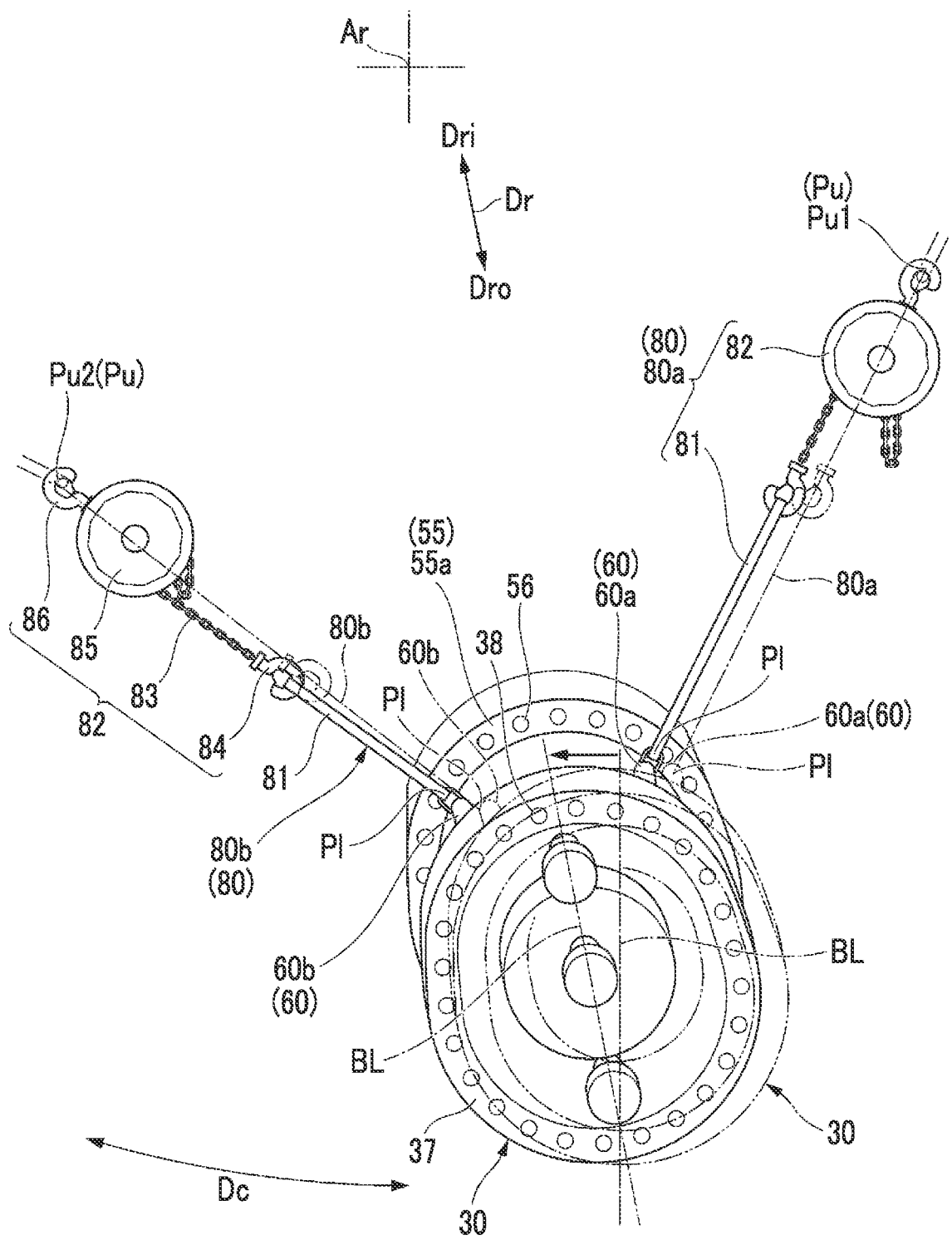
FIG. 8 is an explanatory diagram showing a work content in a circumferential direction adjusting step in an embodiment of the present invention.

Next, the two hanging jigs 60 that are prepared in the preparation step (S1) are mounted to the fuel nozzle 30 (S2: jig mounting step). In this jig mounting step (S3), as shown in FIGS. 7 and 8, a first hanging jig 60a of the two hanging jigs 60 is mounted at a first position of the top flange 37, and a second hanging jig 60b is mounted at a second position of the top flange 37. The second position is a position different from the first position in the circumferential direction Dc with respect to the combustor axis Ac. When the hanging jig 60 is mounted to the top flange 37, as shown in FIG. 10, the screw shaft portion of the first bolt 69 in the hanging jig 60 is inserted into one bolt hole 38 among a plurality of bolt holes 38 of the top flange 37 and them the screw shaft portion of the first bolt 69 is screwed into the first screw hole 64 of the adjustment rod 61.

Next, as shown in FIG. 7, the string material 80 is hooked on each of the two hanging jigs 60 mounted to the fuel nozzle 30, and thus the fuel nozzle 30 together with the two hanging jigs 60 is hung by the string material 80 (S3: component hanging step).

The component hanging step (S3) includes a string material hooking step (S3a), a hanging position moving step (S3b), and a circumferential direction adjusting step (S3c).

In the string material hooking step (S3a), as shown in FIGS. 7 and 8, a first string material 80a is hooked on the first hanging jig 60a out of the two hanging jigs 60, a second string material 80b is hooked on the second hanging jig 60b out of the two hanging jigs 60, and the fuel nozzle 30 together with the first hanging jig 60a and the second hanging jig 60b is hung by the first string material 80a and the second string material 80b. Each of the first string material 80a and the second string material 80b here has an actual string 81 and a chain block 82. The chain block 82 has a chain 83, a lower hook 84 mounted to one end of the chain 83, a block 85 around which the chain 83 is wound, and an upper hook 86 mounted to the block 85. In the string material hooking step (S3a), the upper hook 86 of the chain block 82 is hooked any location of the intermediate casing 51, and a part of the actual string 81 is hooked on the lower hook 84 of the chain block 82, and the other part of the string 81 is hooked on the hanging ring 72 of the hanging jig 60. In this manner, since both the first string material 80a and the second string material 80b have the chain blocks 82, it is possible to change the length of the first string material 80a and the length of the second string material 80b.

In the string material hooking step (S3a), since the fuel nozzle 30 is hung by using the hanging jig 60 described above, the combustor axis Ac of the fuel nozzle 30 hung by the execution of the string material hooking step (S3a) becomes higher on the tip side Dac2 than on the base end side Dac1m, as shown in FIG. 10. Further, as described above, even when the fuel nozzle 30 is mounted to the intermediate casing 51, the combustor axis Ac of the fuel nozzle 30 becomes higher on the tip side Dac2 than on the base end side Dac1. Moreover, the angle α of the combustor axis Ac of the fuel nozzle 30 hung by the execution of the string material hooking step (S3a) with respect to the vertical direction Dv coincides with the angle α of the combustor axis Ac of the fuel nozzle 30 mounted to the lower side of the intermediate casing 51 with respect to the vertical direction Dv. Therefore, in this aspect, it is possible to eliminate or reduce the work of adjusting the inclination of the combustor axis Ac in a state where the fuel nozzle 30, which is a heavy object, is hung by the string material 80.

As described above, here, the method for mounting the fuel nozzle 30 to a first combustor mounting flange 55a which is the combustor mounting flange located at the lowest position, among the plurality of combustor mounting flanges 55 arranged in the circumferential direction Dc around the GT axis Ar will be described. A part of the intermediate casing 51 is present on the upper side of the first combustor mounting flange 55a. Therefore, in a case of being viewed from above, a part of the intermediate casing 51 and the first combustor mounting flange 55a overlap each other in a horizontal direction perpendicular to the GT axis Ar. Therefore, it is difficult to hang the fuel nozzle 30 such that the fuel nozzle 30 faces the first combustor mounting flange 55a. Therefore, in the present embodiment, as shown in FIG. 7, in the string material hooking step (S3a), the position of a first upper hanging point Pu1 which is the upper end of the first string material 80a and the position of a second upper hanging point Pu2 which is the upper end of the second string material 80b are set to be positions which do not overlap the intermediate casing 51 in a horizontal direction perpendicular to the GT axis Ar in a case of being viewed from above.

In the hanging position moving step (S3b), as shown in FIG. 7, the fuel nozzle 30 hung by the first string material 80a and the second string material 80b is moved with respect to the intermediate casing 51 in a direction that includes a component of the horizontal direction perpendicular to the GT axis Ar, whereby the fuel nozzle 30 is moved to a position facing the first combustor mounting flange 55a. Specifically, here, the fuel nozzle 30 is moved by moving the first upper hanging point Pu1 which is the position of the upper end of the first string material 80a hooked on the first hanging jig 60a and the second upper hanging point Pu2 which is the position of the upper end of the second string material 80b hooked on the second hanging jig 60b in the direction that includes the component of the horizontal direction perpendicular to the GT axis Ar, and chancing the length of the first string material 80a and/or the length of the second string material 80b.

In the circumferential direction adjusting step (S3c), as shown in FIG. 8, the direction of a reference line BL determined with respect to the fuel nozzle 30 is adjusted. Here, the reference line BL is a line determined with respect to the fuel nozzle 30 and is a line extending in a direction perpendicular to the combustor axis Ac of the fuel nozzle 30. In the circumferential direction adjusting step (S3c), the relative position of the second hanging jig 60b with respect to the first hanging jig 60a is adjusted such that the direction of the reference line BL of the fuel nozzle 30 in a state where the fuel nozzle 30 is hung coincides with the direction of the reference line BL of the fuel nozzle 30 in a state where the fuel nozzle 30 is mounted to the intermediate casing 51. When adjusting the relative position of the second hanging jig 60b with respect to the first hanging jig 60a, the length of at least one string material 80 out of the first string material 80a and the second string material 80b is adjusted. By the execution of the circumferential direction adjusting step (S3c), each of the plurality of bolt holes 38 of the top flange 37 faces any one bolt screw hole 56 of the plurality of bolt screw holes 56 of the first combustor mounting flange 55a.

With the above, the work in the component hanging step (S3) is ended. The fuel nozzle 30 at the stage when the work in the component hanging step (S3) is ended is in the following states.

a. The angle α of the combustor axis Ac of the hung fuel nozzle 30 with respect to the vertical direction Dv coincides with the angle α of the combustor axis Ac of the fuel nozzle 30 mounted on the first combustor mounting flange 55a of the intermediate casing 51 with respect to the vertical direction Dv.

b. The top flange 37 of the hung fuel nozzle 30 faces the first combustor mounting flange 55a of the intermediate casing 51 to which the top flange 37 is mounted.

c. Each of the plurality of bolt holes 38 of the top flange 37 in the hung fuel nozzle 30 faces any one bolt screw hole 56 of the plurality of bolt screw holes 56 of the first combustor mounting flange 55a.

As described above, when the fuel nozzle 30 is hung by using the hanging jig 60, the combustor axis Ac of the fuel nozzle 30 becomes higher on the tip side Dac2 than on the base end side Dac1. Further, as described above, even when the fuel nozzle 30 is mounted to the intermediate casing 51, the combustor axis Ac of the fuel nozzle 30 becomes higher on the tip side Dac2 than on the base end side Dac1. Therefore, in the present embodiment, it is possible to eliminate or reduce the work of adjusting the inclination of the combustor axis Ac in a state where the fuel nozzle 30, which is a heavy object, is hung by the string material 80.

Figure 9:
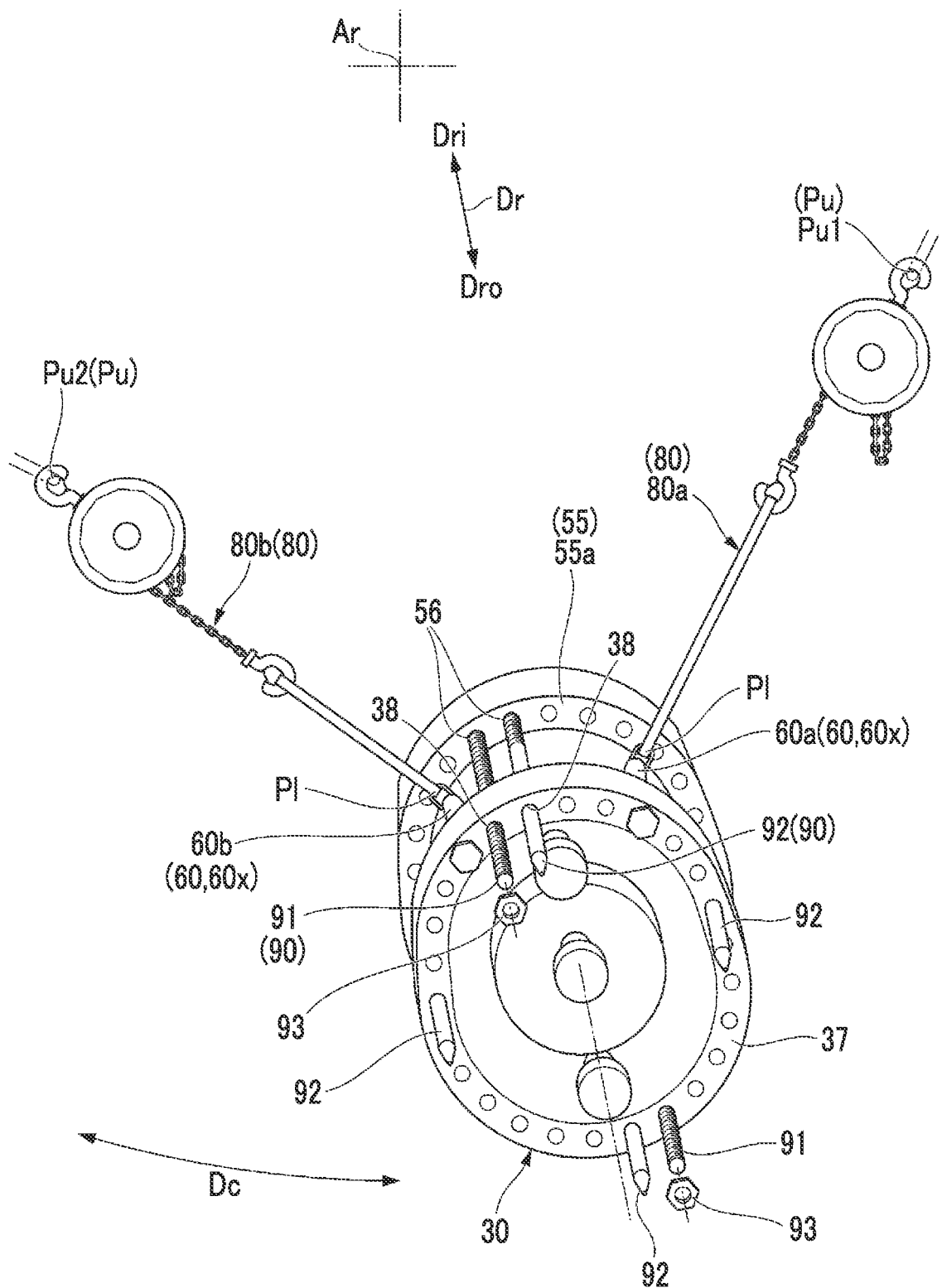
FIG. 9 is an explanatory diagram showing a work content in a guide rod disposing step in an embodiment of the present invention.
Figure 11:
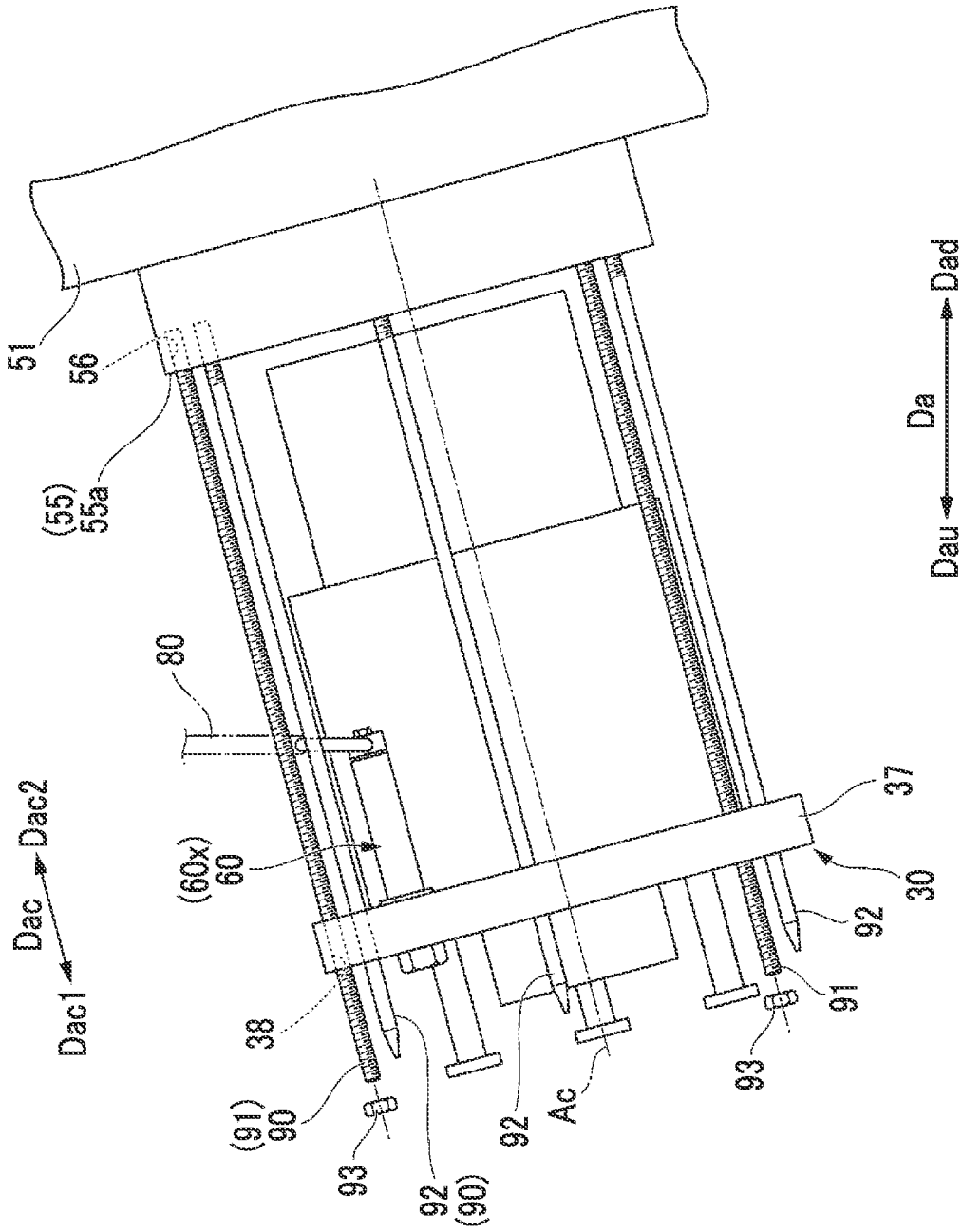
FIG. 11 is a side view of a guide rod and the combustor component during the guide rod disposing step in an embodiment of the present invention.

When the work in the component hanging step (S3) is ended, a guide rod disposing step (S4a), which is a part of a component pushing step, is executed. In this guide rod disposing step (S4a), as shown in FIGS. 9 and 11, a plurality of guide rods 90 are mounted to the first combustor mounting flange 55a of the intermediate casing 51. The plurality of guide rods 90 include a plurality of first guide rods 91 and a plurality of second guide rods 92. A male screw, which can be screwed into the bolt screw hole 56 of the combustor mounting flange 55, is formed on the first guide rod 91 over substantially the entire area in the longitudinal direction thereof. Further, in the second guide rod 92, a male screw, which can be screwed into the bolt screw hole 56 of the combustor mounting flange 55, is formed only at an end portion on one side in the longitudinal direction thereof, and there is no irregularity on the outer peripheral surface of the other portion in the longitudinal direction and this outer peripheral surface is smooth. When the guide rod 90 is mounted to the first combustor mounting flange 55a of the intermediate casing 51, the guide rod 90 is inserted into any one bolt hole 38 of the plurality of bolt holes 38 of the top flange 37, and then the male screw portion of the guide rod 90 is screwed into the bolt screw hole 56 facing one bolt hole 38, among the plurality of bolt screw holes 56 of the first combustor mounting flange 55a. Next, a component moving nut 93 is screwed to a tip portion of the first guide rod 91 to prevent the fuel nozzle 30 from falling from each guide rod 90.

When each guide rod 90 is mounted to the first combustor mounting flange 55a of the intermediate casing 51, each guide rod 90 is parallel to the combustor axis Ac of the fuel nozzle 30 mounted to the first combustor mounting flange 55a of the intermediate casing 51. The expression "parallel" as referred to herein does not need to be parallel in the exact sense, and it is sufficient if it is substantially parallel, and if the angle of the guide rod 90 with respect to the combustor axis Ac is within 5°, it is within the range of parallelism.

Figure 12:
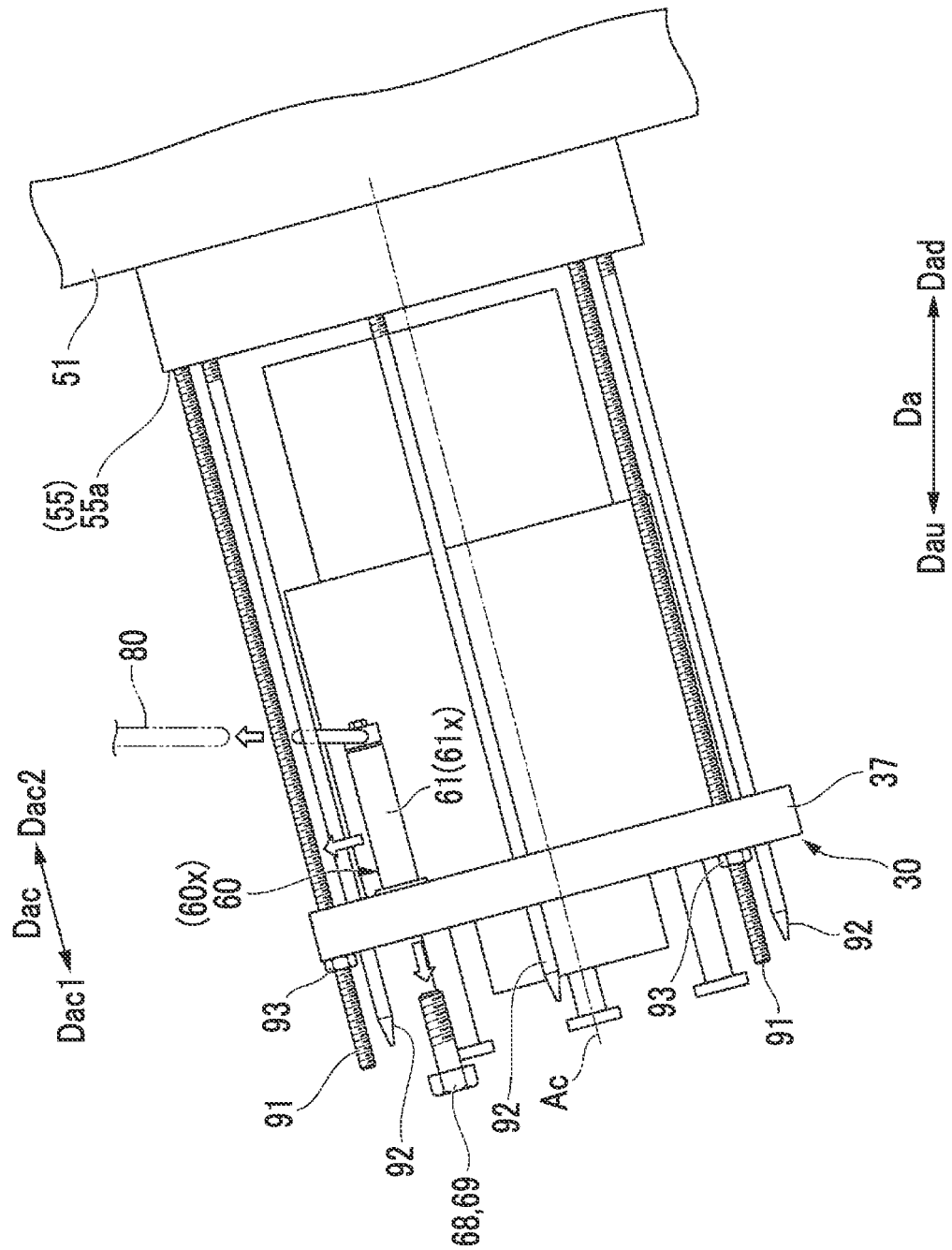
FIG. 12 is a side view of the hanging jig and the combustor component during a jig removing step in an embodiment of the present invention.

When the work in the guide rod disposing step (S4a) is ended, as shown in FIG. 12, the hanging jig 60 is removed from the fuel nozzle 30 (S5: jig removing step). In this jig removing step (S5), first, the string material 80 is removed from the hanging jig 60. Next, the first bolt 69 of the hanging jig 60 is removed from the adjustment rod 61. At this time, for example, a bolt contact surface of a first tool such as a wrench or a spanner is brought into contact with the bolt head of the first bolt 69, a bolt contact surface of a second tool such as a wrench or a spanner is brought into contact with the tool contact surface 66 (refer to FIGS. 4 and 5) of the adjustment rod 61, and the first tool is rotated relative to the second tool. When the first bolt 69 is removed from the adjustment rod 61, the hanging tool 71 is removed from the fuel nozzle 30.

Here, a case where a male screw extending from the end on the longitudinal direction first side De1 of the rod main body 62 to the longitudinal direction second side De2 is formed in the rod main body 62 of the adjustment rod 61 is considered. In this case, the flange fixture is a bolt which can be screwed to this male screw. When removing the hanging jig from the fuel nozzle 30, the bolt that is the flange fixture is removed from the male screw of the adjustment rod 61. Thereafter, the adjustment rod 61 is moved to the longitudinal direction second side De2 such that the male screw of the adjustment rod 61 comes out from the bolt hole 38 of the top flange 37. Then, the adjustment rod 61 is moved in a direction parallel to the flange surface of the top flange 37. Therefore, in this case, when the hanging jig 60 is removed from the top flange 37, a space for moving the adjustment rod 61 is required on the longitudinal direction second side De2 of the hanging jig. However, since the first screw hole 64 into which the first bolt 69 as the flange fixture 68 can be screwed is formed in the rod main body 62 of the adjustment rod 61 in the present embodiment, when the first bolt 69 is removed from the adjustment rod 61, immediately, it is possible to move the adjustment rod 61 in a direction parallel to the flange surface of the top flange 37 without moving the adjustment rod 61 to the longitudinal direction second side De2.

Figure 13:
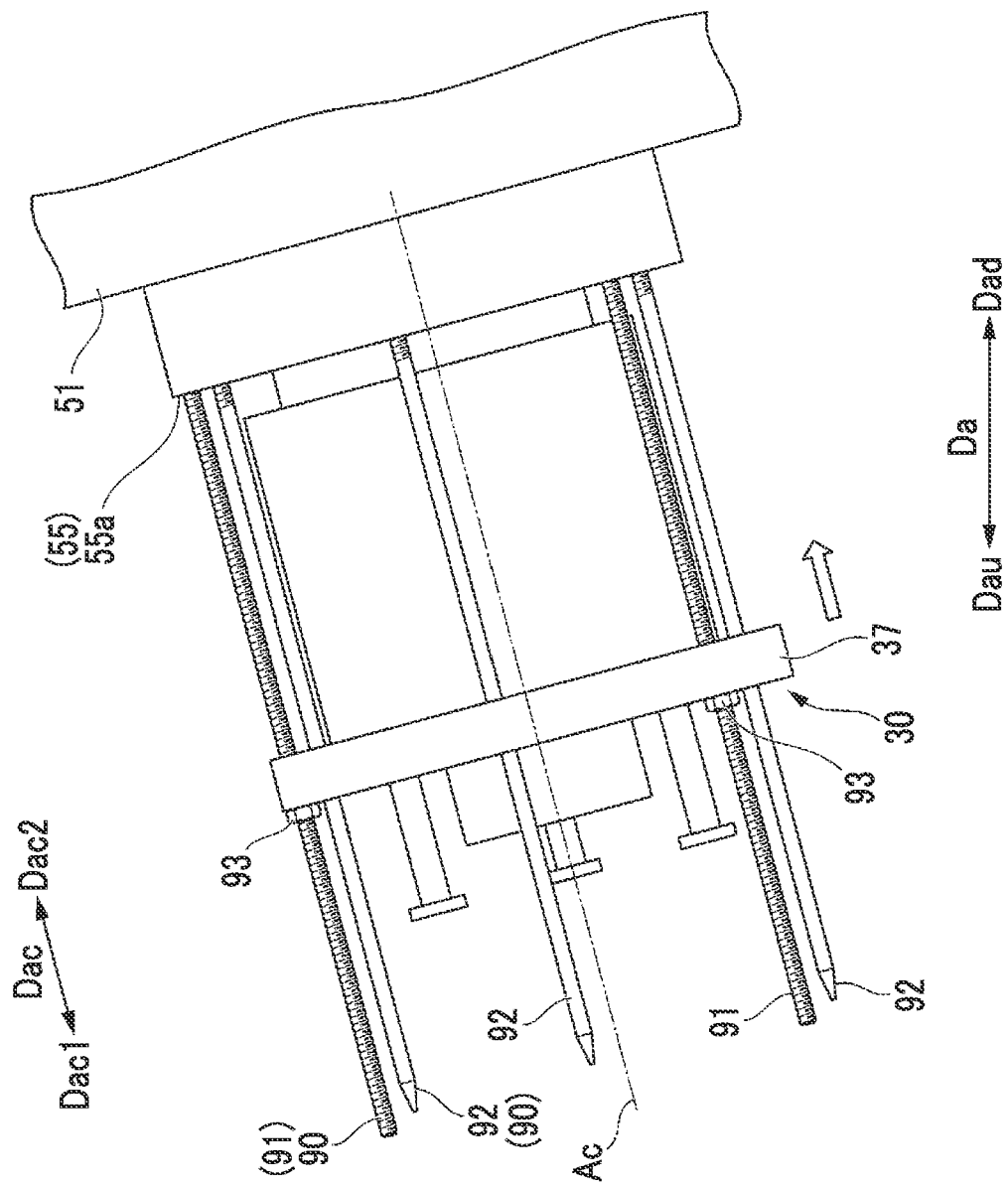
FIG. 13 is a side view of the combustor component during a component parallel moving step in an embodiment of the present invention.

Next, as shown in FIG. 13, a component parallel moving step (S4b), which is a part of the component pushing step, is executed. In this component parallel moving step (S4b), the component moving nut 93 is screwed to the first guide rod 91, the fuel nozzle 30 is slid along each guide rod 90, and the fuel nozzle 30 is brought closer to the first combustor mounting flange 55a of the intermediate casing 51 while maintaining the direction of the combustor axis direction Dac of the hung fuel nozzle 30. The expression "maintaining the direction of the combustor axis direction Dac" as referred to herein does not mean that it is necessary to maintain the direction in the exact sense, and it is sufficient if the direction is substantially maintained, and if a change in direction as within 5° between the start of movement and the end of movement of the fuel nozzle 30, it is within the range in which the direction is maintained. When the top flange 37 of the fuel nozzle 30 comes into contact with the first combustor mounting flange 55a of the intermediate casing 51, the component pushing step that includes the component parallel moving step (S4b) is ended.

Figure 14:
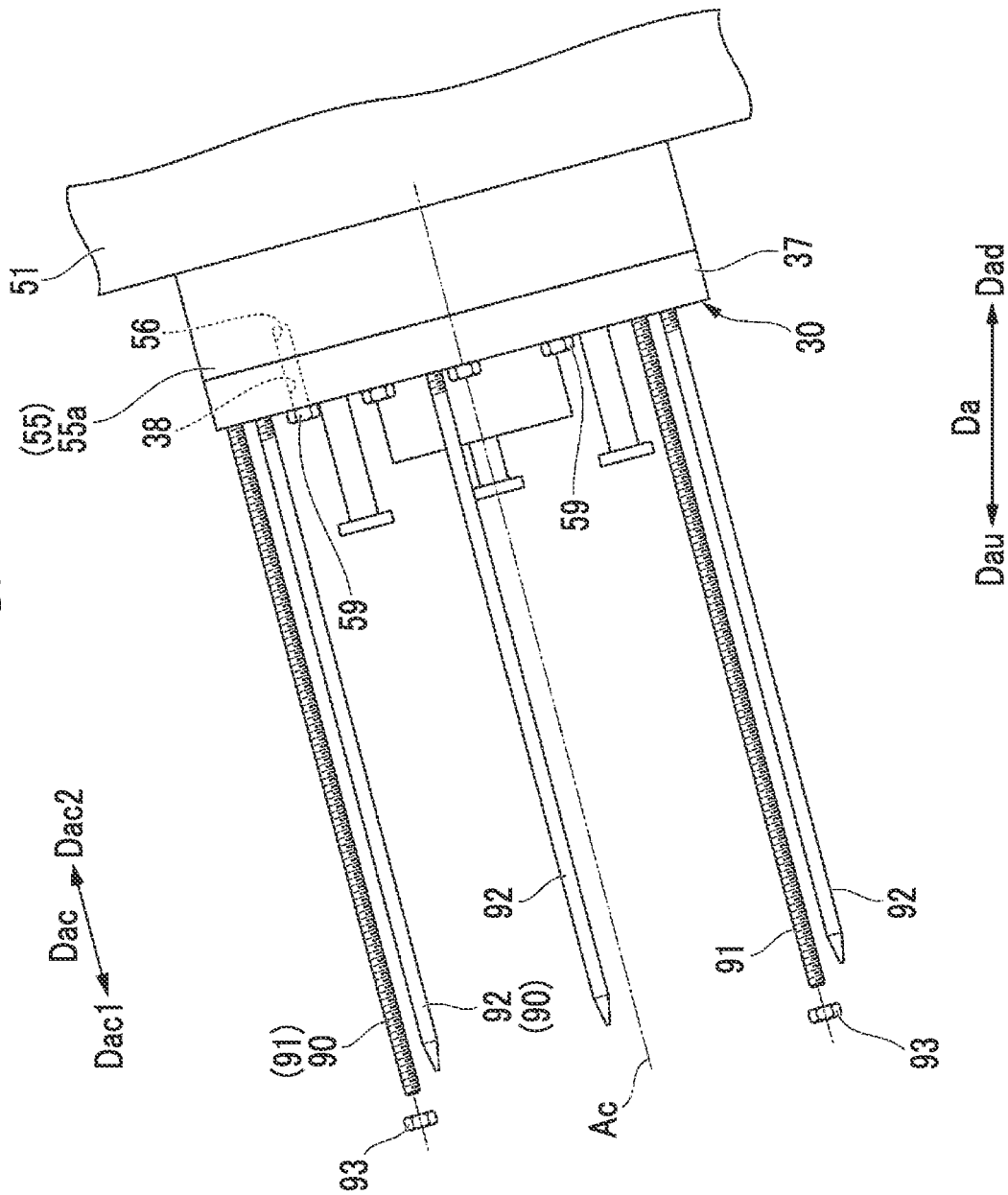
FIG. 14 is a side view of the combustor component during a component mounting step in an embodiment of the present invention.

When the component pushing step is ended, as shown in FIG. 14, the top flange 37 of the fuel nozzle 30 is mounted to the first combustor mounting flange 55a of the intermediate casing 51 (S6: component mounting step). In this component mounting step (S6), first, the screw shaft portion of the combustor mounting bolt 59 is inserted into the bolt hole 38 in which the guide rod 90 is not inserted, among the plurality of bolt holes 38 of the top flange 37, and then the screw shaft portion of the combustor mounting bolt 59 is screwed into the bolt screw hole 56 of the first combustor mounting flange 55a.

Next, the plurality of guide rods 90 mounted to the first combustor mounting flange 55a in the guide rod disposing step (S4a) are removed (S7). Then, after the screw shaft portion of the combustor mounting bolt 59 is inserted into the bolt hole 38 from which the guide rod 90 has been removed, among the plurality of bolt holes 38 of the top flange 37, the screw shaft portion of the combustor mounting bolt 59 is screwed into the bolt screw hole 56 of the first combustor mounting flange 55a.

With the above, the mounting of the fuel nozzle 30 to the first combustor mounting flange 55a located at the lowest position, among the plurality of combustor mounting flanges 55 arranged in the circumferential direction Dc around the GT axis Ar, is completed.

In a case where the fuel nozzle 30 is mounted to another combustor mounting flange 55 adjacent to the first combustor mounting flange 55a located at the lowest position in the circumferential direction Dc (hereinafter, a second combustor mounting flange 55b (refer to FIG. 3)) by using the hanging jig, the procedure is as follows.

In the preparation step (S1), similar to the case of mounting the fuel nozzle 30 to the first combustor mounting flange 55a, two separate hanging jigs 60x are prepared. The separate hanging jig 60x has the second adjustment rod 61x, the flange fixture 68, and the hanging tool 71, as described above using FIG. 4. The length Lx of the second adjustment rod 61x is shorter than the length L of the adjustment rod 61 of the hanging jig 60 that is used when mounting the fuel nozzle 30 to the first combustor mounting flange 55a.

The angle of the combustor axis Ac of the fuel nozzle 30 mounted to the second combustor mounting flange 55b with respect to the vertical direction Dv is larger than the angle of the combustor axis Ac of the fuel nozzle 30 mounted to the first combustor mounting flange 55a with respect to the vertical direction Dv. In other words, the angle of the combustor axis Ac of the fuel nozzle 30 mounted to the second combustor mounting flange 55b with respect to the horizontal direction is smaller than the angle of the combustor axis Ac of the fuel nozzle 30 mounted to the first combustor mounting flange 55a with respect to the horizontal direction.

Therefore, it is preferable that the angle of the combustor axis Ac with respect to the vertical direction Dv when the fuel nozzle 30 that is mounted to the second combustor mounting flange 55b is hung by using the separate hanging jig 60x is also larger than the angle of the combustor axis Ac with respect to the vertical direction Dv when the fuel nozzle 30 that is mounted to the first combustor mounting flange 55a is hung by using the hanging jig 60. Therefore, in a case where the fuel nozzle 30 is mounted to the second combustor mounting flange 55b, the second adjustment rod 61x having the length Lx shorter than the length L of the adjustment rod 61 of the hanging jig 60 used when mounting the fuel nozzle 30 to the first combustor mounting flange 55a is used.

In a case where the fuel nozzle 30 is mounted to the second combustor mounting flange 55b, hereinafter, each of steps S2 to S7 is executed in the same manner as the case where the fuel nozzle 30 is mounted to the first combustor mounting flange 55a.

Next, a case where the fuel nozzle 30 is mounted to the combustor mounting flange 55 which does not overlap the intermediate casing 51 and is located below the GT axis Ar in a horizontal direction perpendicular to the GT axis Ar in a case of being viewed from above (hereinafter referred to as a third combustor mounting flange 55c (refer to FIG. 3)) by using the hanging jig will be described.

In the preparation step (S1), similar to the cases of mounting the fuel nozzle 30 to the first combustor mounting flange 55a and the second combustor mounting flange 55b, two separate hanging jigs 60x are prepared. The separate hanging jig 60x has the second adjustment rod 61x, the flange fixture 68, and the hanging tool 71. However, the length of the second adjustment rod 61x is shorter than the length of the second adjustment rod 61x of the separate hanging jig 60x that is used when mounting the fuel nozzle 30 to the second combustor mounting flange 55b.

Next, the jig mounting step (S2) is executed in the same manner as the case of mounting the fuel nozzle 30 to the first combustor mounting flange 55a.

Next, the component hanging step (S3) is executed. In this component hanging step (S3), the string material hooking step (S3a) and the circumferential direction adjusting step (S3c), among the string material hooking step (S3a), the hanging position moving step (S3b), and the circumferential direction adjusting step (S3c) shown in the flowchart of FIG. 6, are executed, and the hanging position moving step (S3b) is not executed. This is because the third combustor mounting flange 55c is located at a position that does not overlap the intermediate casing 51 in a horizontal direction perpendicular to the GT axis Ar in a case of being viewed from above. Therefore, after the fuel nozzle 30 is hung in the string material hooking step (S3a), it is possible to make the fuel nozzle 30 face the third combustor mounting flange 55c even without moving the fuel nozzle 30.

In a case where the fuel nozzle 30 is mounted to the third combustor mounting flange 55c, hereinafter, each of steps S4a to S7 is executed in the same manner as the case where the fuel nozzle 30 is mounted to the first combustor mounting flange 55a.

When the fuel nozzle 30 is mounted to the third combustor mounting flange 55c, at the point in time when the string material hooking step (S3a) is executed, in a case where it is possible to cause the direction of the reference line BL of the fuel nozzle 30 in a state where the fuel nozzle 30 is hung to coincide with the direction of the reference line BL of the fuel nozzle 30 in a state where the combustor 20 is mounted to the intermediate casing 51, the circumferential direction adjusting step (S3c) in the component hanging step (S3) can be omitted. That is, in this case, in the component hanging step (S3), only the string material hooking step (S3a) is executed and the hanging position moving step (S3b) and the circumferential direction adjusting step (S3c) can be omitted.

As described above, in the component hanging step (S3), in a case where only the string material hooking step (S3a) is executed and the hanging position moving step (S3b) and the circumferential direction adjusting step (S3c) are not executed, the number of the hanging jigs 60 to be prepared in the preparation step (S1) may be one. In this case, the fuel nozzle 30 is hung at one point.

Modification Examples

Hereinafter, modification examples of the embodiments described above will be described.

The string material 80 in the embodiment described above has the actual string 81 and the chain block 82. However, the string material may be any string material as long as the length thereof can be changed, and for example, the string material may have only the chain block 82. Further, the string material may have only the actual string 81. In this case, the length of the string material 80 is changed by changing the position where the string is connected to the hook in the actual string 81.

In the embodiment described above, both the flange fixture 68 and the hanging tool 71 can be mounted to and demounted from the adjustment rod 61. However, only the flange fixture 68 out of the flange fixture 68 and the hanging tool 71 may be mounted to and demounted from the adjustment rod 61.

The combustor component 30 in the embodiment described above is the fuel nozzle 30 having the burner 31, the burner holding cylinder 35, the nozzle base 36, and the top flange 37. However, the combustor component 30 may be any component as long as it is a component having the top flange (the mounting flange) 37 and the nozzle 32 of the burner 31. For example, the combustor component may be a component having only some nozzles among a plurality of nozzles 32 in the fuel nozzle 30, in addition to the top flange (the mounting flange) 37. Further, the combustor component may be the combustor 20 itself.

Additional Remark

The method for mounting a combustor component in the embodiment described above is grasped as follows, for example.

(1) A method for mounting a combustor component according to a first aspect is a method for mounting the combustor component 30 to the gas turbine casing 5, in which the combustor component 30 has the mounting flange 37 that extends in the radial direction with respect to the combustor axis Ac and is mounted to the gas turbine casing 5, and the nozzle 32 that injects fuel and is disposed on the tip side Dac2 out of the base end side Dac1 and the tip side Dac2 in the combustor axis direction Dac in which the combustor axis Ac extends, with respect to the mounting flange 37. In this mounting method, the preparation step S1 of preparing at least one hanging jig 60 for hanging the combustor component 30 with the string material 80, the jig mounting step S2 of mounting the hanging jig 60 to the mounting flange 37 of the combustor component 30, the component hanging step S3 of hooking the string material 80 on the hanging jig 60 mounted to the combustor component 30 and hanging the combustor component 30 together with the hanging jig 60 with the string material 80, the component pushing step of bringing the mounting flange 37 of the combustor component 30 into contact with the combustor mounting position 55 in the gas turbine casing 5 by moving the combustor component 30 to the tip side Dac2 while maintaining the direction of the combustor axis direction Dac in a state where the combustor component 30 is hung, the jig removing step S5 of removing the hanging jig 60 from the mounting flange 37 during the component pushing step and before the mounting flange 37 of the combustor component 30 comes into contact with the gas turbine casing 5, and the component mounting step S6 of mounting the mounting flange 37 at the combustor mounting position 55 of the gas turbine casing 5 after the component pushing step are executed. The hanging jig 60 that is prepared in the preparation step S1 includes the adjustment member 61 having the longitudinal direction De, the flange fixture 68 that is mounted to the end on the longitudinal direction first side De1 out of the longitudinal direction first side De1 and the longitudinal direction second side De2 in the longitudinal direction De of the adjustment member 61, and mounts the adjustment member 61 to the mounting flange 37, and the hanging tool 71 that is mounted to the end on the longitudinal direction second side De2 of the adjustment member 61 and has a portion that becomes the lower hanging point Pl with which the string material 80 comes into contact when the string material 80 is hooked to hang the combustor component 30. The lower hanging point Pl located on the tip side Dac2 with respect to the center of gravity C of the combustor component 30 in the combustor axis direction Dac when the hanging jig 60 is mounted to the mounting flange 37.

In the gas turbine provided with a plurality of combustors 20, when each combustor 20 is mounted to the gas turbine casing 5, the combustor axis Ac of each combustor 20 is inclined with respect to the gas turbine axis (GT axis) Ar so as to be directed toward the radial direction inside Dri with respect to the GT axis Ar as it goes from the gas turbine axis upstream side (GT axis upstream side) Dau toward the gas turbine axis downstream side (GT axis downstream side) Dad. In other words, the combustor axis Ac of the combustor 20 is inclined with respect to the GT axis Ar such that the tip side Dac2 becomes closer to the GT axis Ar than on the base end side Dac1. Therefore, the combustor axis Ac of the combustor 20 disposed below the GT axis Ar, among the plurality of combustors 20, becomes higher on the tip side Dac2 than on the base end side Dac1.

In this aspect, when the combustor component 30 is hung by using the hanging jig 60, the combustor axis Ac of the combustor component 30 becomes higher on the tip side Dac2 than on the base end side Dac1. Therefore, in this aspect, it is possible to eliminate or reduce the work of adjusting the inclination of the combustor axis Ac in a state where the combustor component 30, which is a heavy object, is hung by the string material 80.

(2) In a method for mounting a combustor component according to a second aspect, in the method for mounting the combustor component 30 according to the first aspect, a position of the lower hanging point Pl in the combustor axis direction Dac is a position where the angle α of the combustor axis Ac with respect to the vertical direction Dv in a state where the combustor component 30 is hung in the component hanging step S3 is capable of coinciding with the angle α of the combustor axis Ac with respect to the vertical direction Dv in a state where the mounting flange 37 is mounted to the gas turbine casing 5 in the component mounting step S6. The angle α of the combustor axis Ac is an angle in a virtual plane that extends in the vertical direction Dv and includes the combustor axis Ac.

In this aspect, it is possible to substantially eliminate the work of adjusting the inclination of the combustor axis Ac in a state where the combustor component 30, which is a heavy object, is hung by the string material 80.

(3) In a method for mounting a combustor component according to a third aspect, in the method for mounting a combustor component according to the first or second aspect, the at least one hanging jig 60 that is prepared in the preparation step S1 includes two hanging jigs 60. In the jig mounting step S2, one hanging jig 60 out of the two hanging jigs 60 is mounted at a first position of the mounting flange 37, and the other hanging jig 60 out of the two hanging jigs 60 is mounted at a second position different from the first position in the circumferential direction with respect to the combustor axis Ac in the mounting flange 37. The component hanging step S3 includes the string material hooking step S3a in which the first string material 80a is hooked on the one hanging jig 60, the second string material 80b is hooked on the other hanging jig 60, and the combustor component 30 together with the one hanging jig 60 and the other hanging jig 60 is hung with the first string material 80a and the second string material 80b.

(4) In a method for mounting a combustor component according to a fourth aspect, in the method for mounting a combustor component according to the third aspect, the reference line BL extending in a direction perpendicular to the combustor axis Ac is determined in the combustor component 30 in advance. The component hanging step S3 includes the circumferential direction adjusting step S3c of adjusting a relative position of the other hanging jig 60 with respect to the one hanging jig 60 such that the direction of the reference line BL of the combustor component 30 in a state where the combustor component 30 is hung coincides with the direction of the reference line BL of the combustor component 30 in a state where the mounting flange 37 is mounted to the gas turbine casing 5.

In this aspect, it is possible to cause the direction of the reference line BL of the combustor component 30 in a state where the combustor component 30 is hung to coincide with the direction of the reference line BL of the combustor component 30 in a state where the mounting flange 37 is mounted to the gas turbine casing 5. Therefore, in this aspect, the component mounting step S6 can be easily performed.

(5) In a method for mounting a combustor component according to a fifth aspect, in the method for mounting a combustor component according to the third or fourth aspect, the component hanging step S3 includes the hanging position moving step S3b that is performed after the string material hooking step S3a. In the hanging position moving step S3b, a position in a direction that includes a horizontal direction component of the combustor component 30 with respect to the gas turbine casing 5 is changed by moving a position of as upper end of the first string material 80a hooked on the one hanging jig 60 and a position of an upper end of the second string material 80b hooked on the other hanging jig 60 in the direction that includes a horizontal direction component with respect to the gas turbine casing 5, and the combustor component 30 is moved to a position before execution of the component pushing step. The position before the execution of the component pushing step is a position where the mounting flange 37 of the combustor component 30 is capable of being brought into contact with the combustor mounting position 55 in the gas turbine casing 5 when the combustor component 30 is moved to the tip side Dac2 while maintaining a direction of the combustor axis direction Dac in a state where the combustor component 30 is hung.

It is difficult to hang the combustor component 30 such that the combustor component 30 that is disposed on the lower side of the gas turbine casing 5, among the plurality of combustor components 30, faces the target of the combustor mounting position 55 at which the combustor component 30 is to be mounted in the gas turbine casing 5. Therefore, in this aspect, in the string material hooking step S3a, the position of the upper end of the first string material 80a and the position of the upper end of the second string material 80b are set to be positions that do not overlap the gas turbine casing 5 in a horizontal direction perpendicular to the GT axis Ar in a case of being viewed from above. Thereafter, in this aspect, in the hanging position moving step S3c, the position of the upper end of the first string material 80a and the position of the upper end of the second string material 80b are moved to cause the combustor component 30 to face the target of the combustor mounting position 55 in the gas turbine casing 5.

The hanging jig in the embodiment described above is grasped as follows, for example.

(6) A hanging jig according to a sixth aspect is a hanging jig for hanging the combustor component 30 having the mounting flange 37 that extends in the radial direction with respect to the combustor axis Ac and is mounted to the gas turbine casing 5, the hanging jig including: the adjustment member 61 having the longitudinal direction De; the flange fixture 68 that is mounted to an end on the longitudinal direction first side De1 out of the longitudinal direction first side De1 and the longitudinal direction second side De2 in the longitudinal direction De of the adjustment member 61, and mounts the adjustment member 61 to the mounting flange 37; and the hanging tool 71 having a portion that becomes the lower hanging point Pl with which the string material 80 comes into contact when the string material 60 is hooked to hang the combustor component 30. At least the flange fixture 68 out of the flange fixture 68 and the hanging tool 71 has a structure capable of being mounted to and demounted from the adjustment member 61.

As described above, the combustor axis Ac of the combustor 20 disposed below the GT axis Ar, among the plurality of combustors 20, becomes higher on the tip side Dac2 than on the base end side Dac1. In this aspect, when the combustor component 30 is hung by using the hanging jig 60 having the adjustment member 61 having an adjusted length in the longitudinal direction De, the combustor axis Ac of the combustor component 30 becomes higher on the tip side Dac2 than on the base end side Dac1. Therefore, in this aspect, it is possible to eliminate or reduce the work of adjusting the inclination of the combustor axis Ac in a state where the combustor component 30, which is a heavy object, is hung by the string material 80.

(7) In a hanging jig according to a seventh aspect,
in the hanging jig according to the sixth aspect, the first screw hole 64 recessed from the end on the longitudinal direction first side De1 toward the longitudinal direction second side De2 of the adjustment member 61 is formed in the adjustment member 61. The flange fixture 68 has the first bolt 69 having a screw shaft portion capable of being screwed into the first screw hole 64.

Here, a case where a male screw extending from the end on the longitudinal direction first side De1 to the longitudinal direction second side De2 is formed on the adjustment member 61 is considered. In this case, the flange fixture 68 is a bolt into which this male screw can be screwed. When removing the hanging jig 60 from the fuel nozzle 30, the bolt that is the flange fixture 68 is removed from the male screw of the adjustment member 61. Thereafter, the adjustment member 61 is moved to the longitudinal direction second side De2 such that the male screw of the adjustment member 61 comes out from the mounting flange 37. Then, the adjustment member 61 is moved in a direction parallel to the flange surface of the mounting flange 37. Therefore, in this case, when the hanging jig 60 is removed from the mounting flange 37, a space for moving the adjustment member 61 is required on the longitudinal direction second side De2 of the hanging jig 60. However, in this aspect, since the first screw hole 64 into which the first bolt 69 as the flange fixture 68 can be screwed is formed in the adjustment member 61, when the first bolt 69 is removed from the adjustment member 61, immediately, it is possible to move the adjustment member 61 in a direction parallel to the flange surface of the mounting flange 37 without moving the adjustment member 61 to the longitudinal direction second side De2.

(8) In a hanging jig according to an eighth aspect,
in the hanging jig according to the sixth or seventh aspect, the hanging tool 71 includes the hanging ring 72 that has an annular shape and has a portion that becomes the lower hanging point Pl with which the string material 80 comes into contact when the string material 80 is hooked to hang the combustor component 30, the hanging ring support 73 to which the hanging ring 72 is mounted, and the support fixture 78 that mounts the hanging ring support 73 to an end on the longitudinal direction second side De2 of the adjustment member 61. The support fixture 78 has a structure capable of being mounted to and demounted from the adjustment member 61.

(9) In a hanging jig according to a ninth aspect,
in the hanging jig according to the eighth aspect, the second screw hole 65 recessed from the end on the longitudinal direction second side De2 toward the longitudinal direction first side De1 of the adjustment member 61 is formed in the adjustment member 61. The support fixture 78 has the second bolt 79 having a screw shaft portion capable of being screwed into the second screw hole 65.

(10) In a hanging jig according to a tenth aspect,
in the hanging jig according to the ninth aspect, the second bolt 79 is mounted to the hanging ring support 73 to be rotatable around the screw shaft portion of the second bolt 79 with respect to the hanging ring support 73 and immovable relative to the hanging ring support 73 in the longitudinal direction De in which the screw shaft portion of the second bolt 79 extends.

In this aspect, when the combustor component 30 is hung by using the hanging jig 60, the hanging ring support 73 rotates with respect to the second bolt 79 such that stress occurring in the hanging ring 72 and the hanging ring support 73 is reduced. Therefore, when the combustor component 30 is hung by using the hanging jig 60 of this aspect, it is possible to suppress damage to the hanging jig 60.

(11) In a hanging jig according to an eleventh aspect,
in the hanging jig according to any one of the eighth to tenth aspects, the hanging ring 72 is swingably mounted to the hanging ring support 73.

In this aspect, when the combustor component 30 is hung by using the hanging jig 60, the hanging ring 72 swings with respect to the hanging ring support 73 such that stress occurring in the hanging ring 72 and the hanging ring support 73 is reduced. Therefore, when the combustor component 30 is hung by using the hanging jig 60 of this aspect, it is possible to suppress damage to the hanging jig 60.

(12) In a hanging jig according to a twelfth aspect,
in the hanging jig according to any one of the eighth to eleventh aspects, the adjustment member 61 has two flat tool contact surfaces 66 facing opposite sides from each other in a direction perpendicular to the longitudinal direction De.

In this aspect, the bolt contact surface of a tool such as a wrench or a spanner is brought into contact with the tool contact surface 66 of the adjustment member 61, and the work of mounting the hanging jig 60 to the mounting flange 37 or the work of removing the hanging jig 60 from the mounting flange 37 can be performed by operating the tool. Therefore, the amount of work of these works can be reduced.

The hanging jig set in the embodiment described above is grasped as follows, for example.

(13) A hanging jig set according to a thirteenth aspect includes
the hanging jig according to any one of the eighth to twelfth aspects, and the second adjustment member 61x having a longitudinal direction. The length in the longitudinal direction De of the second adjustment member 61x is different from the length in the longitudinal direction De of the adjustment member 61 of the hanging jig 60. The flange fixture 68 of the hanging jig 60 is capable of being mounted to an end on a longitudinal direction first side De1 out of a longitudinal direction first side De1 and the longitudinal direction second side De2 in the longitudinal direction De of the second adjustment member 61x. The hanging tool 71 of the hanging jig 60 is capable of being mounted to an end on the longitudinal direction second side De2 of the second adjustment member 61x.

With respect to the inclination of the combustor axis Ac of the combustor component 30, when the combustor mounting position 55 in the gas turbine casing 5 is different, the inclination of the combustor axis Ac of the combustor component 30 is different. Therefore, in this aspect, the combustor axis Ac of the combustor component 30 can be inclined according to the mounting position by properly using the hanging jig 60 having the adjustment member 61 and the separate hanging jig 60x having the second adjustment member 61x.

The combustor component set in the embodiment described above is grasped as follows, for example.

(14) A combustor component set according to a fourteenth aspect includes the hanging jig according to any one of the eighth to twelfth aspects, and the combustor component 30. The combustor component 30 has the nozzle 32 that injects fuel, and the nozzle 32 is disposed on the tip side Dac2 out of the base end side Dac1 and the tip side Dac2 in the combustor axis direction Dac in which the combustor axis Ac extends with respect to the mounting flange 37. The lower hanging point Pl of the hanging jig 60 is located on the tip side Dac2 with respect to the center of gravity C of the combustor component 30 in the combustor axis direction Dac when the hanging jig 60 is mounted to the mounting flange 37.

As described above, the combustor axis Ac of the combustor 20 disposed below the GT axis Ar, among the plurality of combustors 20, becomes higher on the tip side Dac2 than on the base end side Dac1. When the combustor component 30 is hung by using the hanging jig 60 of this aspect, the combustor axis Ac of the combustor component 30 becomes higher on the tip side Dac2 than on the base end side Dac1. Therefore, in this aspect, it is possible to eliminate or reduce the work of adjusting the inclination of the combustor axis Ac in a state where the combustor component 30, which is a heavy object, is hung by the string material 80.

(15) A combustor component set according to a fifteenth aspect includes:

the combustor component 30 having the mounting flange 37 that extends in the radial direction with respect to the combustor axis Ac and is mounted to the gas turbine casing 5, and the nozzle 32 that injects fuel and is disposed on the tip side Dac2 out of the base end side Dac1 and the tip side Dac2 in the combustor axis direction Dac in which the combustor axis Ac extends with respect to the mounting flange 37; and the hanging jig 60 that hangs the combustor component 30 with the string material 80. The hanging jig 60 includes the adjustment member 61 having the longitudinal direction De; the flange fixture 68 that is mounted to an end on the longitudinal direction first side De1 out of the longitudinal direction first side De1 and a longitudinal direction second side De2 in the longitudinal direction De of the adjustment member 61, and mounts the adjustment member 61 to the mounting flange 37; and the hanging tool 71 that is mounted to an end on the longitudinal direction second side De2 of the adjustment member 61 and has a portion that becomes the lower hanging point Pl with which the string material 80 comes into contact when the string material 80 is hooked to hang the combustor component 30. The lower hanging point Pl is located on the tip side Dac2 with respect to the center of gravity C of the combustor component 30 in the combustor axis direction Dac when the hanging jig 60 is mounted to the mounting flange 37.

As described above, the combustor axis Ac of the combustor 20 disposed below the GT axis Ar, among the plurality of combustors 20, becomes higher on the tip side Dac2 than on the base end side Dac1. When the combustor component 30 is hung by using the hanging jig 60 of this aspect, the combustor axis Ac of the combustor component 30 becomes higher on the tip side Dac2 than on the base end side Dac1. Therefore, in this aspect, it is possible to eliminate or reduce the work of adjusting the inclination of the combustor axis Ac in a state where the combustor component 30, which is a heavy object, is hung by the string material 80.

(16) In a combustor component set according to a sixteenth aspect, in the combustor component set according to the fifteenth aspect, at least the flange fixture 68 out of the flange fixture 68 and the hanging tool 71 has a structure capable of being mounted to and demounted from the adjustment member 61.

INDUSTRIAL APPLICABILITY

In the present disclosure, it is possible to eliminate or reduce the work of adjusting the inclination of the combustor axis in a state where the combustor component, which is a heavy object, is hung by the string material. Therefore, according to the present disclosure, it is possible to reduce the labor hour of the work of mounting the combustor component to the gas turbine casing.

REFERENCE SIGNS LIST

1: gas turbine rotor
5: gas turbine casing
10: compressor
11: compressor rotor
12: rotor shaft
13: rotor blade row
15: compressor casing
16: stator vane row
20: combustor
21: combustion cylinder (or transition piece)
24: combustion cylinder support
30: fuel nozzle (or combustor component)
31: burner
32: nozzle
35: burner holding cylinder
36: nozzle base
37: top flange (mounting flange)
38: bolt hole
40: turbine
41: turbine rotor
42: rotor shaft
43: rotor blade row
45: turbine casing 46: stator vane row
49: combustion gas flow path
51: intermediate casing
52: upstream-side flange
53: downstream-side flange
54: opening
55: combustor mounting flange (mounting position)
55a: first combustor mounting flange
55b: second combustor mounting flange
55c: third combustor mounting flange
59: combustor mounting bolt
56: bolt screw hole
60: hanging jig
60a: first hanging jig
60b: second hanging jig
60x: separate hanging jig
61: adjustment rod (or adjustment member)
61x: second adjustment rod (or second adjustment member)
62: rod main body
63: receiving flange
64: first screw hole
65: second screw hole
66: tool contact surface
68: flange fixture
69: first bolt
71: hanging tool
72: hanging ring
73: hanging ring support
74: support main body
75: sleeve
78: support fixture
79: second bolt
80: string material
80a: first string material
80b: second string material
81: string
82: chain block
83: chain
84: lower hook
85: block
86: upper hook
90: guide rod
91: first guide rod
92: second guide rod
93: component moving nut
Ao: outside air
A: compressed air
G: combustion gas
Ar: gas turbine axis (GT axis)
Ac: combustor axis
As: rod axis
Ay: swing axis
Ax: central axis
Da: gas turbine axis direction (GT axis direction)
Dac: combustor axis direction
Dr: radial direction
Dri: radial direction inside
Dro: radial direction outside
Dc: circumferential direction
De: longitudinal direction
De1: longitudinal direction first side
De2: longitudinal direction second side
BL: reference line
Pl: lower hanging point
Pu: upper hanging point
C: center of gravity

The invention claimed is:

1. A method for mounting a combustor component to a gas turbine casing, the combustor component having a mounting flange that extends in a radial direction with respect to a combustor axis and that is capable of being mounted to the gas turbine casing, the combustor axis extending in a combustor axis direction between a base end side and a tip side, the base end side and the tip side being opposite to each other, and a nozzle that injects fuel and is disposed on the tip side, with respect to the mounting flange, the method comprising: preparing at least one hanging jig for hanging the combustor component with a string material; mounting the at least one hanging jig to the mounting flange of the combustor component; hooking a string material on the at least one hanging jig mounted to the combustor component and hanging the combustor component together with the at least one hanging jig with the string material; pushing the combustor component so as to bring the mounting flange of the combustor component into contact with a combustor mounting position in the gas turbine casing by moving the combustor component to the tip side while maintaining a direction of the combustor axis direction in a state where the combustor component is hung; removing the at least one hanging jig from the mounting flange during the pushing of the combustor component and before the mounting flange of the combustor component comes into contact with the gas turbine casing; and mounting the mounting flange at the combustor mounting position of the gas turbine casing after the pushing of the combustor component, wherein the at least one hanging jig includes an adjustment member having a longitudinal direction which extends between a longitudinal direction first side and a longitudinal direction second side which are opposite to each other, the longitudinal direction first side being on the base end side in the combustor axis direction and the longitudinal direction second side being on the tip side in the combustor axis direction, a flange fixture that is mounted to an end on the longitudinal direction first side of the adjustment member, and mounts the longitudinal direction first side end of the adjustment member to a tip side surface of the mounting flange, and a hanging tool that is mounted to an end on the longitudinal direction second side of the adjustment member and has a portion that becomes a lower hanging point with which the string material comes into contact when the string material is hooked to hang the combustor component, wherein the adjustment member has a screw hole which is recessed from an end of the adjustment member on the longitudinal direction first side toward the longitudinal direction second side, wherein the flange fixture has a bolt having a screw shaft portion that can be screwed into the screw hole, wherein the mounting of the at least one hanging jig includes inserting the screw shaft portion into a bolt hole in the mounting flange, and screwing the screw shaft portion into the screw hole, wherein an intersection point between the combustor axis and a virtual plane that is perpendicular to the combustor axis and includes the lower hanging point is located on the tip side with respect to a center of gravity of the combustor component in the combustor axis direction when the at least one hanging jig is mounted to the mounting flange, and wherein in the hanging of the combustor component, the combustor component is hung so that a portion of the tip side of the combustor component with respect to the center of gravity is higher than a portion of the base end side of the combustor component with respect to the center of gravity.

2. The method for mounting a combustor component according to claim 1, wherein a position of the lower hanging point in the combustor axis direction is a position where an angle of the combustor axis with respect to a vertical direction in a state where the combustor component is hung in the hanging of the combustor component is capable of coinciding with an angle of the combustor axis with respect to the vertical direction in a state where the mounting flange is mounted to the gas turbine casing and the angle of the combustor axis is an angle in a virtual plane that extends in the vertical direction and includes the combustor axis.

3. The method for mounting a combustor component according to claim 1, wherein the preparing of the at least one hanging jig includes preparing two hanging jigs, wherein the mounting of the at least one hanging jig includes mounting a first hanging jig of the two hanging jigs at a first position of the mounting flange, and mounting a second hanging jig of the two hanging jigs at a second position different from the first position in a circumferential direction with respect to the combustor axis in the mounting flange, and wherein the hooking of the string material on the at least one hanging jig includes hooking the string material as a first string material on the first hanging jig, and hooking a second string material on the second hanging jig, and the hanging of the combustor component together with the at least one hanging jig includes hanging the combustor component together with the first hanging jig and the second hanging jig with the first string material and the second string material.

4. The method for mounting a combustor component according to claim 3, wherein a reference line extending in a direction perpendicular to the combustor axis is determined in the combustor component in advance, and the hanging of the combustor component includes adjusting a relative position of the second hanging jig with respect to the first hanging jig such that a direction of the reference line of the combustor component in a state where the combustor component is hung coincides with a direction of the reference line of the combustor component in a state where the mounting flange is mounted to the gas turbine casing.

5. The method for mounting a combustor component according to claim 3, wherein the hanging of the combustor component includes moving a hanging position of the combustor component after the hooking of the first string material and the hooking of the second string material, in the moving of the hanging position, a position in a direction that includes a horizontal direction component of the combustor component with respect to the gas turbine casing is changed by moving a position of an upper end of the first string material hooked on the first hanging jig and a position of an upper end of the second string material hooked on the second hanging jig in the direction that includes a horizontal direction component with respect to the gas turbine casing, and the combustor component is moved to a position before the pushing of the combustor component, and the position before the pushing of the combustor component is a position where the mounting flange of the combustor component is capable of being brought into contact with the combustor mounting position in the gas turbine casing when the combustor component is moved to the tip side while maintaining the direction of the combustor axis direction in a state where the combustor component is hung.

6. The method for mounting a combustor component according to claim 1, wherein the hanging tool has a hanging ring formed in an annular shape and includes the portion that becomes the lower hanging point, and wherein the hanging ring is rotatable around the longitudinal direction of the adjustment member and swingable around a swing axis perpendicular to the longitudinal direction of the adjustment member.

* * * * *